United States Patent
Conroy et al.

(10) Patent No.: US 6,315,302 B1
(45) Date of Patent: Nov. 13, 2001

(54) SKEW RESISTING HYDRODYNAMIC SEAL

(75) Inventors: William T. Conroy, Pearland; Lannie L. Dietle, Sugar Land; Jeffrey D. Gobeli; Manmohan S. Kalsi, both of Houston, all of TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 09/558,497

(22) Filed: Apr. 26, 2000

Related U.S. Application Data

(60) Provisional application No. 60/131,435, filed on Apr. 26, 1999.

(51) Int. Cl.$^7$ ................................................ F16J 15/32
(52) U.S. Cl. ......................... 277/559; 277/560; 277/572; 277/574
(58) Field of Search ................................ 277/559, 560, 277/572, 573, 574, 584

(56) References Cited

U.S. PATENT DOCUMENTS

| | | |
|---|---|---|
| 3,173,698 | * 3/1965 | Haberkorn . |
| 3,744,805 | 7/1973 | Heinrich . |

(List continued on next page.)

FOREIGN PATENT DOCUMENTS

| | | |
|---|---|---|
| 0030085 | 6/1981 | (EP) . |
| 0860351 | 8/1998 | (EP) . |
| 499480 | 1/1939 | (GB) . |
| 9837347 | 8/1998 | (WO) . |

OTHER PUBLICATIONS

"Kalsi Seals Rotary Shaft Seal Catalog," Kalsi Engineering, Inc., Dec. 1, 1993.

Kalsi, M.S., et al. "A Novel High–Pressure Rotary Shaft Seal Facilitates Innovations in Drilling and Production Equipment.", SPE#37627, 1997.

(List continued on next page.)

*Primary Examiner*—Lynne H. Browne
*Assistant Examiner*—Alison K. Pickard
(74) *Attorney, Agent, or Firm*—James L. Jackson; Mayor, Day, Caldwell & Keeton, LLP

(57) ABSTRACT

A novel hydrodynamically lubricated compression type rotary seal that is suitable for lubricant retention and environmental exclusion. Particularly, the seal geometry ensures constraint of a hydrodynamic seal in a manner preventing skew-induced wear and provides adequate room within the seal gland to accommodate thermal expansion. The seal accommodates large as-manufactured variations in the coefficient of thermal expansion of the sealing material, provides a relatively stiff integral spring effect to minimize pressure-induced shuttling of the seal within the gland, and also maintains interfacial contact pressure within the dynamic sealing interface in an optimum range for efficient hydrodynamic lubrication and environment exclusion. The seal geometry also provides for complete support about the circumference of the seal to receive environmental pressure, as compared the interrupted character of seal support set forth in U.S. Pat. Nos. 5,873,576 and 6,036,192 and provides a hydrodynamic seal which is suitable for use with non-Newtonian lubricants.

27 Claims, 6 Drawing Sheets

U.S. PATENT DOCUMENTS

| | | | |
|---|---|---|---|
| 3,892,418 | * | 7/1975 | Felt . |
| 4,288,083 | | 9/1981 | Braconier . |
| 4,387,902 | * | 6/1983 | Conover . |
| 4,484,753 | | 11/1984 | Kalsi . |
| 4,610,319 | | 9/1986 | Kalsi . |
| 4,619,534 | | 10/1986 | Daly et al. . |
| 5,195,757 | | 3/1993 | Dahll . |
| 5,230,520 | | 7/1993 | Dietle et al. . |
| 5,482,296 | * | 1/1996 | Peppiatt et al. . |
| 5,678,829 | | 10/1997 | Kalsi et al. . |
| 5,704,615 | * | 1/1998 | Wheeler . |
| 5,738,358 | | 4/1998 | Kalsi et al. . |
| 5,763,956 | | 6/1998 | Metz et al. . |
| 5,823,541 | | 10/1998 | Dietel et al. . |
| 5,873,576 | | 2/1999 | Dietle et al. . |
| 6,007,105 | | 12/1999 | Dietle et al. . |
| 6,036,192 | | 3/2000 | Dietle et al. . |
| 6,120,036 | * | 9/2000 | Kalsi et al. ........................ 277/559 |

OTHER PUBLICATIONS

Ayala, Hugo M., et al. "Seal Design for Reduced Wear in Abrasive Slurries", pp 1–17, FEDSM97–3446; Fluids Engineering Division Summer Meeting, American Society of mechanical Engineers, Jun. 22–26, 1997.

Ayala, Hugo M., et al., "Wear of Elastomeric Seals in Abrasive Slurries," pp 9–21, Wear 220 (1998) Elsevier Sciences S.A., Aug. 28, 1997.

Kalsi, M.S., et al. "Feasibility Study of a Slated O–Ring as a High Pressure Rotary Seal" ASME Paper No. 72–WA/ DE–14 (1972).

Kalsi, M.S., Elastohydrodynamic Lubrication of Offset O–Ring Rotary Seal, ASME Transactions, Journal of Lubrication Technology, vol. 103; Paper 80–C2/Lub–7, American Society of Mechanical Engineers, Jul. 1981. ASME Paper No. 80–C2/Lub–7 (1980).

Horve, Leslie A. "Shaft Seals for Dynamic Applications", pp 338–339; Marcel Dekker, Inc., 1996.

* cited by examiner

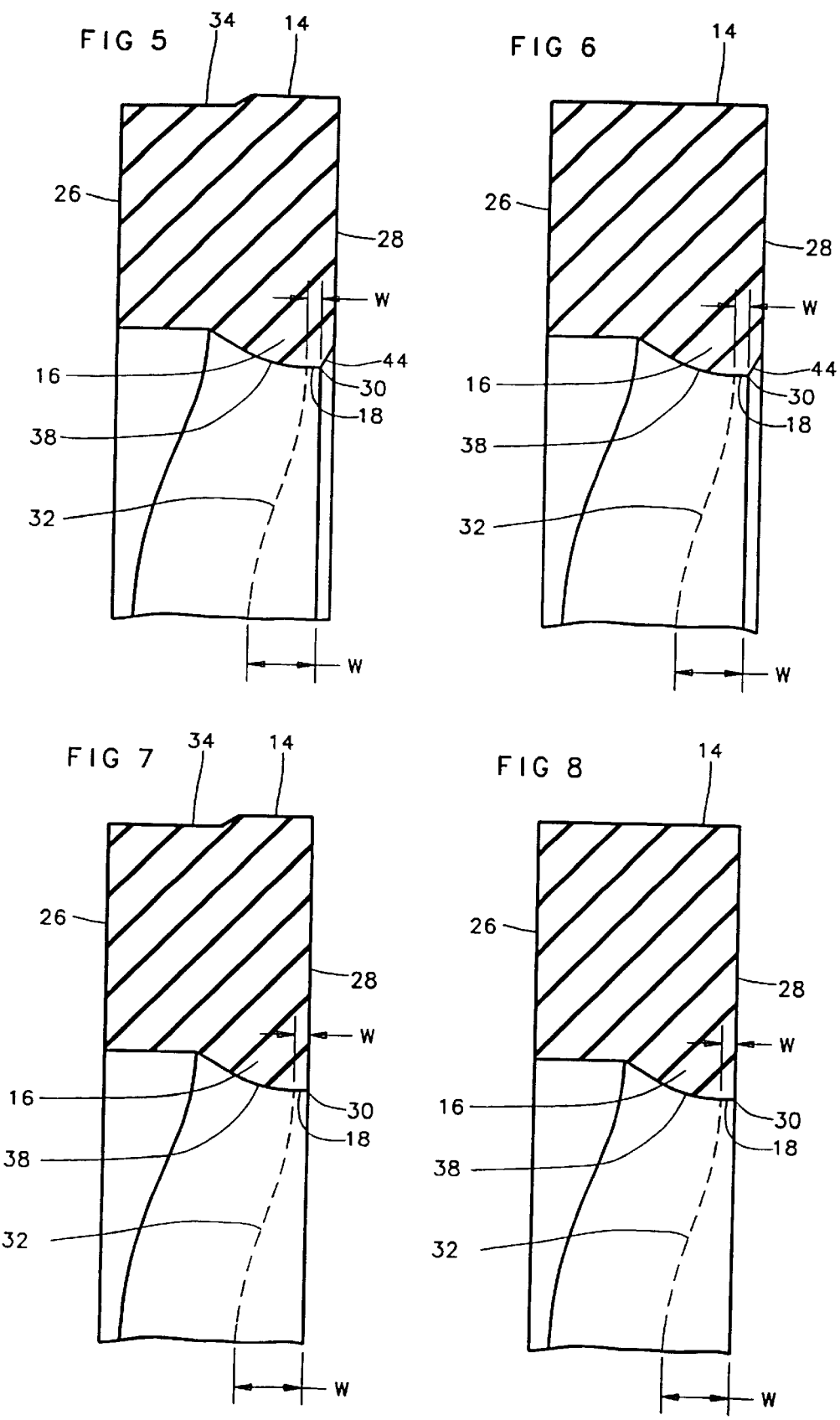

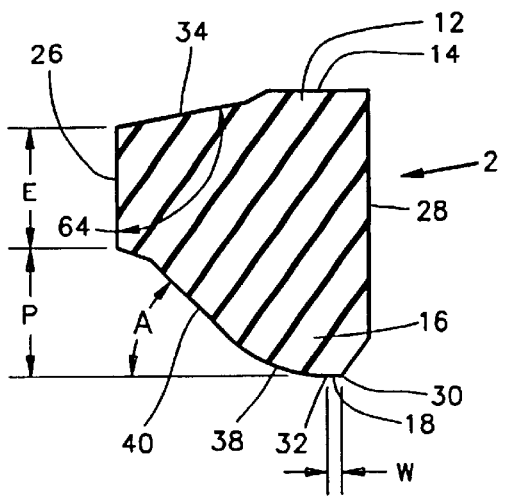
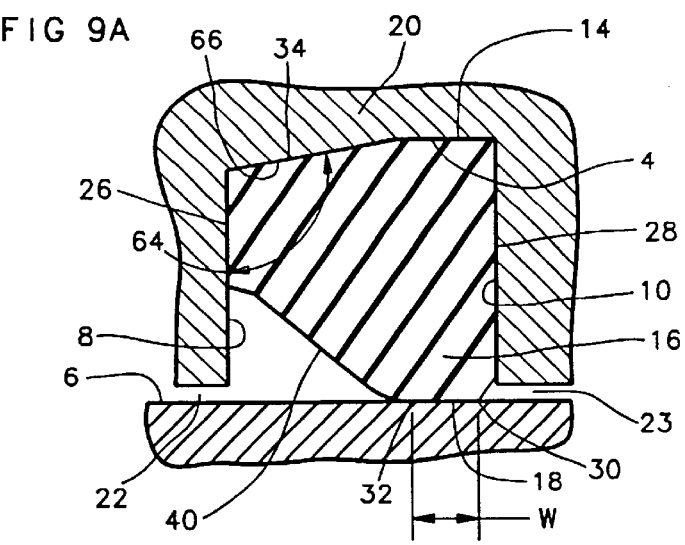
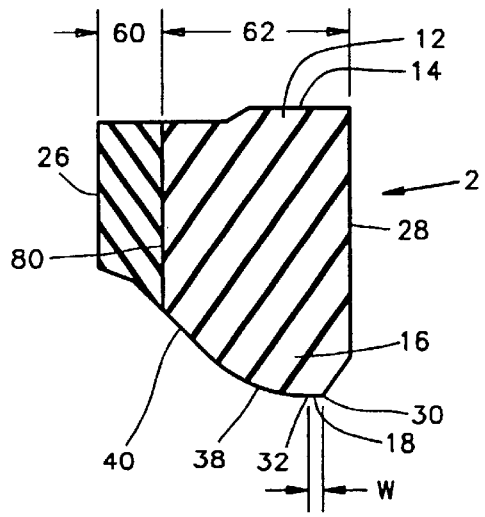

SKEW RESISTING HYDRODYNAMIC SEAL

Applicants hereby claim the benefit of U.S. Provisional Application Serial No. 60/131,435 filed on Apr. 26, 1999 by William T. Conroy, Lannie L. Dietle, Jeffrey D. Gobeli, and Manmohan S. Kalsi and entitled "Improved Skew-Resisting Hydrodynamic Seal", which provisional application is incorporated herein by reference for all purposes.

STATEMENT REGARDING FEDERALLY SPONSORED RESEARCH OR DEVELOPMENT

This invention was made with United States Government support under Contract No. DE-FG03-96ER82199 awarded by the Department of Energy. The United States Government therefore has certain rights in this invention.

BACKGROUND OF THE INVENTION

1. Field of the Invention

This invention relates generally to hydrodynamic rotary seals, such as rotary shaft seals, for establishing a seal between a relatively rotating surface and a structure, which wedge a lubricant film between the seal and the relatively rotating surface to inhibit seal wear and to exclude contaminants from the dynamic sealing interface. More specifically the present invention concerns ring-like rotary seals of the interference type which are composed of resilient sealing material which are contained within seal grooves and provide a seal geometry that cooperates with the seal groove to provide resistance to becoming skewed or twisted within the seal groove.

2. Description of the Prior Art

The prior art hydrodynamically lubricated compression-type rotary shaft seals disclosed in U.S. Pat. Nos. 4,610,319, 5,230,520, 5,678,829, 5,738,358, 5,873,576 and 6,036,192 are known in the industry by the registered trademark "Kalsi Seals", and pertain to products of Kalsi Engineering, Inc. of Sugar Land, Tex. The prior art teaches that the installed width of the body of such seals is difficult to predict, and can vary considerably due to a number of factors, including tolerances, compression variations, and thermal expansion. The prior art also consistently teaches that the width of the seal groove that is provided for such seals must be larger than the worst case installed width of the seal body in order to prevent increased interfacial contact pressure at the dynamic sealing interface resulting from simultaneous radial and axial constraint, and in order to prevent impairment of the hydrodynamic film and associated seal wear from such increased contact pressure. The contact pressure at the seal to shaft interface is one of the most important factors relating to hydrodynamic performance of the seal because it influences film thickness.

In U.S. Pat. No. 4,610,319 FIGS. 1 and 1A, the installed width of hydrodynamic seal member 50 is illustrated as being narrower than the width of seal groove 52. In FIG. 1B of the same patent, the installed width of hydrodynamic seal member 61 is illustrated as being less than the width of circular seal groove 63.

Likewise, in all of the figures in commonly assigned U.S. Pat. Nos. 5,230,520, 5,678,829 and 5,738,358 which illustrate an installed hydrodynamic seal, the width of the seal body is less than the width of the seal groove; see U.S. Pat. No. 5,230,520 FIGS. 1, 2, 4, 6, 7, 8, 9, 10 and 12, U.S. Pat. No. 5,678,829 FIGS. 1A, 3A and 4A, and U.S. Pat. No. 5,738,358 FIGS. 1, 2A, 4 and 5A. Prior art teaching pertaining to the importance of having a seal groove width that is wider than the installed width of the body of a hydrodynamic seal is also discussed in considerable detail in commonly assigned U.S. Pat. Nos. 5,873,576 and 6,036,192.

Hydrodynamic seal sales and implementation literature has also consistently taught the importance of providing a seal groove width that is wider than the installed width of the seal body in order to prevent seal damage associated with simultaneous radial and axial seal constraint. For example, this subject has been discussed in the "Gland Width Considerations" portion of the Kalsi Seals Rotary Shaft Seal Catalog PN 362-1, beginning with the catalog issue of Dec. 1, 1993, which states "The axial width of a Kalsi Seals gland has to be designed to accommodate the width of the compressed seal. Four primary factors affect the compressed seal width; (1) seal material displaced axially as a result of radial compression, (2) seal material displaced axially by the thermal expansion of the elastomer, (3) volumetric swelling of the elastomer due to media exposure, and (4) seal tolerances. If the groove length is not large enough to accommodate the aforementioned factors, the interfacial contact pressure between the seal and the shaft can increase dramatically, and result in a drastic reduction in hydrodynamic lubrication, and a corresponding decrease in seal performance."

The prior art also teaches that in the absence of differential pressure, the hydrodynamic rotary shaft seals of the type disclosed in U.S. Pat. Nos. 4,610,319, 5,230,520, 5,678,829 and 5,738,358 may be subject to skew-induced wear from impingement of environmental abrasives. For example, the "Gland Width Considerations" portion of the Kalsi Seals Rotary Shaft Seal Catalog PN 362-1 states "Seals used in applications having no differential pressure may tend to "snake" in the gland due to the effects of circumferential compression and thermal expansion. If snaking is present during rotation, the sharp exclusionary edge on the environmental side of the seal sweeps the shaft and causes environmental media impingement upon the environmental end of the seal. If the environmental media contains abrasive particulates, the impingement may cause abrasive wear of the environmental end of the seal. Some of the abrasives may also be swept into the dynamic sealing interface and cause interfacial seal and shaft wear."

The skew-induced impingement wear mechanism, and a solution that requires a washer and a mechanical spring to help to stabilize the seal against skew and to accommodate width variations of the seal body resulting from seal tolerances and thermal expansion, are described in SPE/IADC Paper No. 37627. This method prevents skew-induced impingement wear in the absence of differential pressure, but the seal can be subjected to pressure-responsive travel within the seal groove if the environment pressure exceeds the lubricant pressure and creates a hydraulic force across the area of the seal which exceeds the spring force. Unless the spring force is very consistent about the circumference of the seal, the environmental pressure may cock the seal within its groove, causing skew-induced impingement wear.

Commonly assigned U.S. Pat. Nos. 5,873,576 and 6,036,192 describe the skew-induced impingement wear mechanism in detail, and describe the use of resilient spring projections which are integral with, and projecting from, the seal body. These resilient projections are intended to stabilize the seal against skew-induced impingement wear while accommodating changes in the width of the circular seal body resulting from seal tolerances, thermal expansion, and seal material displaced by varying seal compression.

Testing has shown that the seal geometry disclosed in U.S. Pat. Nos. 5,873,576 and 6,036,192 successfully prevents skew induced wear in the absence of pressure, as was intended, and as such represents an improvement over older seal designs for certain applications. However, if the environmental pressure exceeds the lubricant pressure, the incomplete support provided by the resilient spring projections can in some embodiments permit the differential pressure to deform the seal body within the seal groove such that the seal attains a twisted and/or locally skewed position which is less favorable to environmental exclusion.

Testing has also shown that certain embodiments of seals constructed per the teachings of U.S. Pat. Nos. 5,873,576 and 6,036,192 are subject to pressure-responsive travel in the seal groove if the environment pressure exceeds the lubricant pressure and creates a hydraulic force which exceeds the spring force of the resilient spring projections. When the environment pressure is then removed, the difference in friction between the static sealing interface and the dynamic sealing interface can result in momentary twisting of the seal, which can be conducive to environmental ingestion.

In the seals disclosed in U.S. Pat. Nos. 5,873,576 and 6,036,192, communication passages are provided that communicate past the resilient spring projections to the cavity formed by the lubricant side groove wall, the peripheral groove wall, and the resilient spring projections themselves. The communication passages typically takes the form of the circumferential spacing of the spring projections. Testing has shown that the communication passages must be kept small for best seal constraint. However, in high runout applications, a small passage is less than optimum for use with non-Newtonian lubricants such as grease because the viscous resistance of the lubricant is not well suited to the rapid flow required through the passages in response to rapidly occurring volumetric changes caused by runout. As operating temperatures increase, the passages unfortunately become even smaller and less suitable for non-Newtonian lubricants due to thermal expansion of the sealing material.

With liquids containing particulates are forced into a small cavity, and then expelled out, the liquid fraction is more easily expelled than the particulates, and the particulates tend to build up and become entrapped in the cavity, where they typically create a tightly packed mass. The seals of U.S. Pat. Nos. 5,873,576 and 6,036,192 are not particularly suitable for use with greases containing solid lubricant particles because the particles will tend to pack-up in the small communication passages, and in the cavity formed by the lubricant side groove wall, the peripheral groove wall, and the resilient spring projections. Such greases are commonly used in the oil well drilling industry to lubricate heavily loaded critical service bearings.

Relatively soft sealing materials are often desirable for low pressure hydrodynamic seals because they help to minimize interfacial contact pressure, to maximize hydrodynamic lubricant film thickness, and to minimize seal-generated heat. The differential pressure-induced twisting, skewing and seal travel phenomena discussed above in conjunction with the seals disclosed in U.S. Pat. Nos. 5,873,576 and 6,036,192 are unfortunately more severe when a relatively soft sealing material, such as an 80 durometer Shore A elastomer, is employed.

SUMMARY OF THE INVENTION

The invention concerns a rotary seal device comprising a generally ring-shaped interference-type direct compression-type, rather than flexing, cantilever lip-type rotary seal defining a seal volume "S" and defining a mean seal diameter "Dm" and further comprising a solid generally circular seal body composed of resilient material and defining a first seal body end and a second seal body end. A static sealing surface is defined by said generally solid circular seal body.

There is at least one compression-type dynamic sealing lip projecting from said solid generally circular seal body and being oriented in generally opposed relation to said static sealing surface, and defining a dynamic sealing surface having a variable width, said dynamic sealing lip providing for hydrodynamic lubrication of said dynamic sealing surface.

Said static sealing surface is separated from said dynamic sealing surface by a seal depth D, and said first seal body end is separated from said second seal body end by a seal width L. The seal volume S is the amount of space that the seal occupies at room temperature, as measured in cubic units. The seal volume S can be determined by any suitable method, such as by employing Archimedes' principle, wherein the volume of liquid displaced by an immersed object is equal to the volume of the object, or such as employing engineering software to calculate the volume of a computer-generated "solid model" representing the dimensions of the seal, or such as by hand calculation; for example by employing Pappus or Guldinus rules of volumetric calculation using the average cross-section of the seal. The seal volume S, when divided by the product of seal width L times the seal depth D times the mean seal diameter Dm times 3.1416, yields a quotient of less than 0.84.

It is preferred that said dynamic sealing lip project from said solid generally circular seal body by a projection dimension "P" being at least 30% of said seal depth D.

The first seal body end 26 has a depth dimension "E", and it is preferred that the projection dimension "P" of said dynamic sealing lip being at least 75% of said depth dimension "E" of said first seal body end.

The solid generally circular seal body defines a theoretical center-line; and when said solid generally circular seal body is viewed in a longitudinal cross-section taken along said theoretical center-line, a hydrodynamic inlet curve having a rate of curvature is defined by said dynamic sealing lip, and Said rate of curvature of said hydrodynamic inlet curve is desired to be less than the rate of curvature of a 1/8 inch radius, and preferred to be less than the rate of curvature of a 5/32 inch radius, so that the hydrodynamic inlet curve is greater than a 1/8 inch radius and preferably larger than a 5/32 inch radius.

It is preferred that a rebated surface be defined by said solid generally circular seal body for minimizing the volume of said interference-type rotary seal, said rebated surface defining a static sealing lip which is preferred to be in substantially opposed relation to said dynamic sealing lip.

Said rebated surface is typically oriented in respect to said first seal body end by an angle of 90 degrees, but to minimize seal volume, said rebated surface can be oriented in respect to said first seal body end by and angle greater than 90 degrees. Likewise, said static sealing surface is typically oriented in respect to said first seal body end by an angle of 90 degrees, but to minimize seal volume, said static sealing surface can be oriented in respect to said first seal body end by and angle greater than 90 degrees. A circular ridge 74 can be defined by said second seal body end for establishing sealed relation with a seal groove wall.

Said interference-type rotary seal can optionally be comprised of a first length and a second length 62, said first length being adjacent to said first seal body end, and said second length being adjacent to said second seal body end, and said first length being comprised of a first resilient material, and said second length being comprised of a second resilient material. The modulus of elasticity of said first resilient material can be less than the modulus of elasticity of said second resilient material. If desired, said first resilient material can be a porous fibrous material providing less stiffness than the stiffness of said second resilient material.

The rotary seal device of the present invention can further comprise a structure having a generally circular seal groove defined by a first groove wall, by a second groove wall being in spaced relation to said first groove wall, and by a peripheral seal groove wall, said generally circular seal groove having a seal groove volume, said seal volume "S" being less than said seal groove volume.

The rotary seal device of the present invention can further incorporate a relatively rotatable surface, said generally circular seal groove holding said interference-type rotary seal in compression against said relatively rotatable surface, said first seal body end being in contact with said first groove wall and said second seal body end being in contact with said second groove wall.

From a descriptive standpoint, a seal gland having a seal gland volume is defined by said seal groove and said relatively rotatable surface, and said seal volume "S" should be less than 85% of said seal gland volume.

Said interference-type rotary seal can be oriented for radial sealing whereby said static sealing surface has a larger diameter than said dynamic sealing surface, or said interference-type rotary seal can be oriented for radial sealing whereby said dynamic sealing surface 18 has a larger diameter than said static sealing surface. Alternately, said interference-type rotary seal can be oriented for axial sealing whereby said first seal body end has a larger diameter than said second seal body end 28, or said interference-type rotary seal can be oriented for axial sealing whereby said second seal body end has a larger diameter than said first seal body end.

A flexible transitional heel can be defined by the dynamic sealing lip having circular intersection with said second seal body end remote from said dynamic sealing surface, and having circular intersection with said dynamic sealing surface remote from said second seal body end. Said flexible transitional heel can be a chamfer defining a chamfer angle with respect to said second seal body end 28, and it is preferred that said chamfer angle be less than 31 degrees.

Said peripheral groove wall 4 and said relatively rotatable surface are in radially spaced relation by a spaced radial relation dimension "DG", and said spaced relation between said first groove wall and second groove wall defining a spacing dimension "LG". It is preferred that the mathematical result of D×L be equal to or greater than the result of DG×DL.

It is a primary object of the present invention is to provide a novel hydrodynamically lubricated compression type rotary seal that is suitable for lubricant retention and environmental exclusion;

It is another object of the present invention to constrain a hydrodynamic seal in a manner preventing skew-induced wear, to provide adequate room within the seal gland for thermal expansion, to accommodate large as-manufactured variations in the coefficient of thermal expansion of the sealing material, to provide a relatively stiff integral spring effect to minimize pressure-induced shuttling of the seal within the gland, and to maintain interfacial contact pressure within the dynamic sealing interface in an optimum range for efficient hydrodynamic lubrication and environment exclusion;

It is a further object of the present invention to provide complete support about the circumference of the seal to receive environmental pressure, as compared the interrupted support of U.S. Pat. Nos. 5,873,576 and 6,036,192; and It is also an object of the present invention to provide a hydrodynamic seal which is suitable for use with non-Newtonian lubricants.

Briefly, the various objects and features of the present invention are achieved by a compression-type hydrodynamic rotary seal adapted to be received within a circular seal groove defined by first and second spaced seal groove walls and a peripheral seal groove wall, and adapted for sealing with the peripheral seal groove wall and for establishing a sealing interface with a relatively rotatable surface being in opposed spaced relation with the peripheral seal groove wall, and adapted for defining a partition between a lubricant and an environment.

The hydrodynamic seal of the present invention is comprised of a solid circular seal body composed of sealing material and adapted to be received within the circular seal groove and defining first and second opposed ends, said solid circular seal body being adapted for compression between the peripheral seal groove wall and the relatively rotatable surface, and being adapted for compression between the first and second spaced seal groove walls.

The seal has a circular dynamic sealing projection extending from said solid circular seal body for compressed sealing engagement with the relatively rotatable surface and for compressing said solid circular seal body, and has a wavy hydrodynamic inlet geometry providing for hydrodynamic wedging of a lubricant film between said circular dynamic sealing projection and the relatively rotatable surface responsive to rotation of the relatively rotatable surface. The hydrodynamic inlet geometry is preferably a radius greater than $\frac{1}{8}$ inch. The circular dynamic sealing projection has a sharp edged circular exclusionary geometry being defined by one end of said circular dynamic sealing projection and adapted to be exposed to the environment for excluding environment intrusion at the sealing interface of said rotary seal and the relatively rotatable surface.

The seal may also have at least one circular static sealing projection extending from said solid circular seal body and being located in generally opposed relation with said circular dynamic sealing projection for compressed static sealing engagement with the peripheral seal groove wall and for compressing said solid circular seal body. The circular static sealing projection may extend from said solid circular seal body less than the extension of said circular dynamic sealing projection from said solid circular seal body. The circular static sealing projection and the circular dynamic sealing projection may each located at one axial extremity of said circular seal body. The seal body is proportioned to be adaptable for compression between the first and second spaced seal groove walls.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention may admit to other equally effective embodiments.

In the Drawings

FIGS. 5–8 are partial longitudinal sectional views showing bi-directional hydrodynamically lubricated seals representing alternative embodiments of the present invention;

FIGS. 9 and 9A are partial longitudinal sectional views showing bi-directional hydrodynamically lubricated interference type seals representing further alternative embodiments of the present invention, with the seal of FIG. 9A being shown within a circular seal groove and having sealing engagement with a relatively rotatable surface;

FIG. 10 is a partial longitudinal sectional view showing a hydrodynamically lubricated interference type seal representing another embodiment of the present invention and being composed of two complimentary materials.

DESCRIPTION OF THE PREFERRED EMBODIMENT

The present invention is a hydrodynamically lubricated compression-type (i.e. interference-type, rather than flexing, cantilever lip-type) rotary shaft seal that is suitable for lubricant retention and environmental exclusion, which cooperates with an installation groove to provide resistance to wear. It has been engineered such that it's geometry, interfacial contact pressure, and response to relative rotary motion combine to generate a hydrodynamic lubricant film which separates the seal from the mating relatively rotatable surface, and combine to exclude contaminants, and thereby promote long sealing life. The thickness of the film is proportional to the interfacial contact pressure and also dependent on other factors, such as the installed shape of the hydrodynamic geometry and the viscosity of the lubricant. The seals of the present invention are bi-directional; that is to say they achieve efficient hydrodynamic lubrication in response to either clockwise or counter-clockwise relative rotation.

The invention is directed at preventing skew-induced abrasive impingement wear in installations where little or no differential pressure is present across the seal, and in installations where the environment pressure may be greater or less than the lubricant pressure, and in applications where the pressure is fluctuating, reversing, and/or pulsating. The seal of the present invention also resists pressure-induced travel within the seal groove, and the sometimes concurrent twisting of the dynamic sealing lip within the seal groove, which can in the prior art result in abrasive ingestion. Experiments conducted by the inventors and their associates has confirmed that the cooperative features and benefits of the present invention provide better abrasion resistance than the prior art of U.S. Pat. No. 5,230,520 in the absence of differential pressure, which is the condition where skew-induced abrasion can be a problem.

Figure 1:
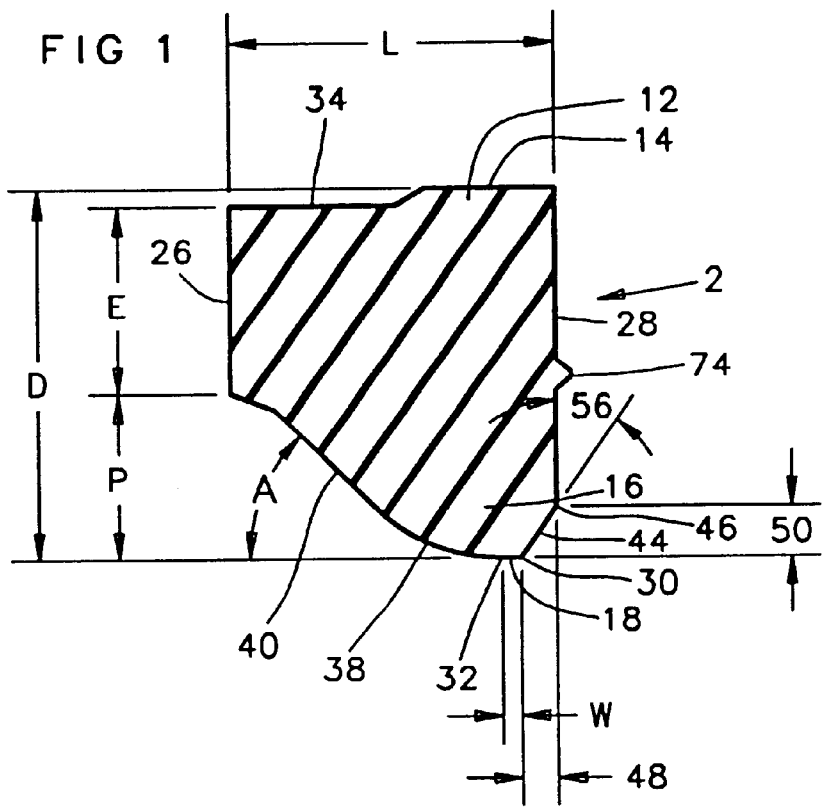
FIG. 1 is a partial longitudinal sectional view showing a skew resisting hydrodynamic seal representing the preferred embodiment and best mode of the present invention.
Figure 1A:
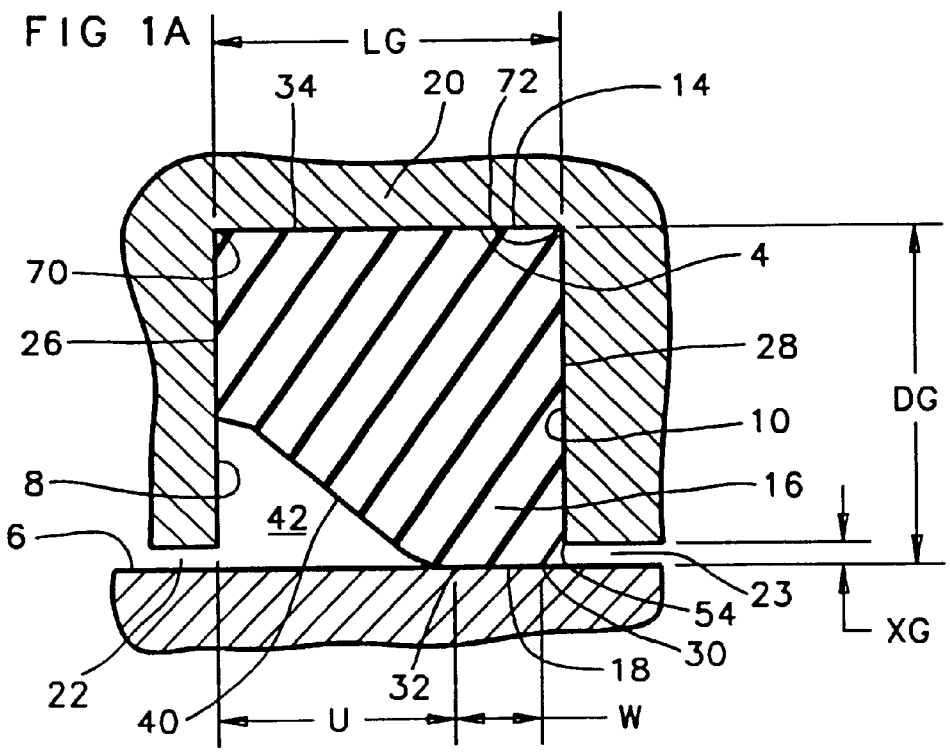
FIG. 1A is a sectional view showing the skew resisting hydrodynamic seal of FIG. 1 located within the circular seal gland of a structure, such as a housing, and disposed in sealing relation with a relatively rotatable surface.

Referring now to the drawings, and specifically to FIGS. 1 and 1A, there are shown two views that represent the preferred embodiment of this invention. FIGS. 1 and 1A are fragmentary longitudinal cross-sectional illustrations of a hydrodynamically lubricated interference-type rotary shaft seal 2, with FIG. 1 showing the uninstalled condition of the seal 2, and with FIG. 1A illustrating the installed condition of the seal 2 within the generally circular seal groove 3 of a structure 20 such as a housing and compressed in sealing relation against peripheral groove wall 4 and against relatively rotatable surface 6, and secured in skew resisting confinement between first groove wall 8 and second groove wall 10 of the generally circular seal groove 3.

Seal 2 has a solid generally circular seal body 5 which has a first seal body end 26 having a Depth "E", and which has a second seal body end 28.

In the hydrodynamic seal industry, first groove wall 8 is often referred to as the "lubricant side gland wall", and second groove wall 10 is often referred to as the "environment side gland wall". Likewise, the first seal body end 26 is often referred to as the lubricant end, and the second seal body end 28 is often referred to as the environment end. First groove wall 8 and second groove wall 10 are in spaced, generally opposed relation to each other, and the first seal body end 26 and the second seal body end 28 are in generally opposed relation to each other. Peripheral groove wall 4 and relatively rotatable surface 6 are also in generally opposed relation, and peripheral groove wall 4 is sized to hold the seal 2 in compression against relatively rotatable surface 6.

For the purpose of establishing consistent nomenclature in this document, the seal "groove" 3 is the void in structure 20 that is defined by peripheral groove wall 4, first groove wall 8 and second groove wall 10. Also for the purpose of establishing consistent nomenclature, the seal "gland" is the enclosed space defined by peripheral groove wall 4, first groove wall 8, second groove wall 10 of the generally circular seal groove 3, and relatively rotatable surface 6.

This invention has application where a relatively rotatable surface 6 is sealed with respect to a structure 20 with either the structure 20 or the relatively rotatable surface, or both, being rotatable. Although first groove wall 8 and second groove wall 10 are shown to be in fixed, permanent relation with one another, such is not intended to limit the scope of the invention, for the invention admits to other equally suitable forms. For example, First groove wall 8 and/or second groove wall 10 could be detachable from the structure for ease of maintenance and repair, but installed in fixed relation to each other during equipment operation to constrain seal 2.

Seal 2 may be composed of any one of a number of suitable materials including elastomeric or rubber-like sealing material and various polymeric sealing materials, or any suitable combination thereof, including a composite construction where one portion of the seal is of a different material than the other, however, seal 2 is constructed at least in part from a resilient sealing material such as an elastomer. The preferred material is an elastomer having a nominal Shore A hardness in the range of 73–92. Seal 2, which has a generally ring shaped solid body, is adapted to be received in a generally circular seal groove 3 of a structure or housing 20, and used to partition a lubricant 22 from an environment 23 which may contain abrasive particulate matter, and is used to prevent intermixing of the environment into the lubricant, and is used for controlling seal deformation and for controlling interfacial contact force between the seal 2 and the relatively rotatable surface 6. Seal 2 incorporates a compression-type dynamic sealing lip 16 that is of generally circular configuration which defines dynamic sealing surface 18. Seal 2 preferably also incorporates a projecting static sealing lip 12 which defines a static sealing surface 14. Dynamic sealing lip 16 and static sealing lip 12 are oriented in generally opposed relation to each other to minimize the potential of twisting of seal 2 within the generally circular seal groove 3.

The seal 2 may be configured for radial or axial (face) sealing. In a radial sealing configuration, static sealing surface 14, dynamic sealing surface 18, peripheral groove wall 4 and relatively rotatable surface 6 may be of substantially cylindrical configuration, and first groove wall 8, second groove wall 10, first seal body end 26, and second seal body end 28 may be of substantially planar configuration, and said dynamic sealing lip 16 may project from said solid generally circular seal body 5 in a substantially radial direction.

In an axial (face) sealing configuration, static sealing surface 14, dynamic sealing surface 18, peripheral groove wall 4 and relatively rotatable surface 6 may be of substantially planar configuration, and first groove wall 8, second groove wall 10, first seal body end 26, and the second seal body end 28 may be of substantially cylindrical configuration, and said dynamic sealing lip 16 may project from said solid generally circular seal body 5 in a substantially radial direction.

In large diameter seals, the cross-section of a seal of the present invention is typically limp enough that if made originally for a radially sealing configuration, it can simply be torsionally twisted by 90 degrees to work in a face sealing configuration. In smaller diameter seal implementations, such seals are torsionally stiffer, and it is preferred that they be manufactured to be a radially oriented seal or an axially oriented seal, as may be required by a particular sealing application.

Local length "U" is the length of that portion of seal 2 which does not contact relatively rotatable surface 6. Compression of seal 2 between peripheral groove wall 4 and relatively rotatable surface 6 establishes a generally circular static sealing interface between peripheral groove wall 4 and the mating static sealing surface 14, and establishes a generally circular dynamic sealing interface between relatively rotatable surface 6 and the mating dynamic sealing surface 18, said dynamic sealing interface having a local width "W" which is equal to width "LG" minus local length "U". When seal 2 is installed in compression between peripheral groove wall 4 and relatively rotatable surface 6, local width "W" consists of dynamic sealing surface 18 and a portion of hydrodynamic inlet curve 38 due to compression induced flattening of dynamic sealing lip 16.

Structure 20 forms at least part of a lubricant chamber which serves to contain lubricant 22. When relative rotation occurs between structure 20 and relatively rotatable surface 6, the circumferential direction of relative rotation is normal to the plane of the cross-section of FIGS. 1 and 1A, and seal 2 remains stationary relative to structure 20 and maintains a static sealing interface with structure 20, and relatively rotatable surface 6 slips with respect to dynamic sealing surface 18 at a given rotational velocity "V" and the interface between seal 2 and the relatively rotatable surface 6 becomes a dynamic sealing interface. The environment side exclusion edge 30 of dynamic sealing surface 18 is circular and preferably abrupt, and the lubricant side edge 32 of dynamic sealing surface 18 is non-circular, per the teachings of U.S. Pat. No. 4,610,319, and therefore local width "W" of the dynamic sealing surface 18 varies about the circumference of seal 2. Likewise, the width and cross-sectional area of the dynamic sealing lip 16 varies about the circumference of the seal 2. The non-circular lubricant side edge 32 of dynamic sealing surface 18 and hydrodynamic inlet curve 38 together form a wavy hydrodynamic inlet geometry providing for hydrodynamic lubrication of the seal. As a result of the variations in local width "W" of the dynamic sealing surface 18, a component of rotational velocity "V" wedges a film of lubricant into the dynamic sealing interface between the dynamic sealing lip 16 and relatively rotatable surface 6, thereby causing dynamic sealing surface 18 to hydrodynamically lift and ride on the film, thereby lubricating dynamic sealing surface 18 and relatively rotatable surface 6 per the teachings of U.S. Pat. No. 4,610,319. This lubricant film physically separates the seal 2 and the relatively rotatable surface 6, and thereby prevents the typical dry rubbing type wear associated with conventional non-hydrodynamic interference-type seals, and thereby prolongs seal and mating surface life and makes higher service pressures practical. The non-circular character of the lubricant side edge 32 can take any one of many suitable forms that result in a gradually converging, non-circular shape at the lubricant side of the dynamic sealing lip 16 without departing from the spirit or scope of the present invention.

Since local width "W" varies in width about the circumference of the seal, it is necessary for the sake of clarity to note that the cross-sections of FIGS. 1 and 1A are taken at a circumferential location which represents the average dimension of such variation of local width "W", and which corresponds to the mid-point height of the hydrodynamic wave geometry described in U.S. Pat. No. 4,610,319. It is also useful to note that hydrodynamic inlet curve 38 and unconstrained geometry 40 are non-circular, and vary in position as a function of the variation of local width "W". When relative rotation is not present, a liquid tight seal is maintained at the static sealing interface between the static sealing surface 14 and peripheral groove wall 4, and between the dynamic sealing surface 18 and the relatively rotatable surface 6.

When seal 2 is compressed between peripheral groove wall 4 and relatively rotatable surface 6, the width "L" of the body of the seal 2 increases due to displacement of compressed seal material. When seal 2 is subjected to elevated temperature operating conditions, the width "L" of the body of the seal 2 further tends to increase due to thermal expansion. Seal 2 is often used in an elevated temperature environment, and also generates its own heat due to lubricant shear and asperity contact in the dynamic sealing interface. The seal experiences volumetric thermal expansion, which is about triple the linear coefficient of thermal expansion.

In the prior art, it has been specifically taught that the seal body should not be in simultaneous contact with both the lubricant side gland wall and the environment side gland wall, because such confinement, in view of the unpredictable installed width of the seal, could cause high interfacial contact pressure incompatible with hydrodynamic lubrication at the dynamic sealing interface, resulting in seal damage. Contrary to conventional wisdom and the teachings of the prior art, the body of the seal 2 of the present invention is intended to be simultaneously in contact with both the first groove wall 8 and the second groove wall 10 during operation; that is to say that the first seal body end 26 of seal 2 is intended to contact first groove wall 8, and the second seal body end 28 of seal 2 is intended to contact second groove wall 10 during operation. The effectiveness of this approach was not obvious prior to extensive finite element analysis and testing, and was contrary to expectations and prior engineering judgement.

For ease of installation, the room temperature, uninstalled width "L" of Seal 2 can be less than the distance "LG" between first groove wall 8 and second groove wall 10. Seal 2 can be designed such that the aforementioned thermal expansion-induced and installation compression-induced increase in width "L" causes seal 2 to be simultaneously in contact with both the first groove wall 8 and the second groove wall 10 during operation. In practice, width "L" cannot increase to a value greater than the distance "LG" between first groove wall 8 and second groove wall 10 because of the physical constraint provided by first groove wall 8 and second groove wall 10. Once width "L" has increased to the point that it equals the distance "LG" between first groove wall 8 and second groove wall 10, any additional compression or thermal expansion of seal 2 is compensated by displacement of unconstrained geometry 40 and hydrodynamic inlet curve 38 toward relatively rotatable surface 6. Local width "W" increases as a function of increased confinement of the seal, and as a function of increased temperature-induced thermal expansion.

As noted previously, local length "U" is the length of seal 2 which does not contact relatively rotatable surface 6. The seal body 5 of the present invention serves as an integral spring element over local length "U", and unconstrained geometry 40 and hydrodynamic inlet curve 38 bulge toward relatively rotatable surface 6 when seal 2 is squeezed between first groove wall 8 and second groove wall 10 as a result of seal compression, tolerance accumulation, and thermal expansion.

Experiments conducted by the inventors and their associates has confirmed that the cooperative features and benefits of the present invention-contrary to conventional wisdom and the teaching of the prior art-operates hydrodynamically while the body of the seal 2 is being simultaneously confined by first groove wall 8, second groove wall 10, peripheral groove wall 4 and relatively rotatable surface 6. Adequate hydrodynamic lubrication of dynamic sealing surface 18 has been found to occur even when seal 2 is also exposed to high ambient temperature (250 degree Fahrenheit) and a level of simultaneous confinement exceeding worst case tolerance conditions.

During part of the extensive testing regimen, the seal was installed in a test fixture which permitted the width "LG" of the generally circular seal groove 3 to be reduced while relative rotation occurred between structure 20 and relatively rotatable surface 6. Contrary to conventional wisdom, testing has revealed that up to a certain point, as increasing confinement occurred as a result of distance "LG" being reduced, the hydrodynamic operating torque of the seal actually decreased. This result was not obvious prior to running the test, and was contrary to expectations and prior engineering judgement.

One of the key features of the present invention is the minimization of seal volume in order to provide sufficient expansion volume within the gland to accommodate (by displacement of unconstrained geometry 40 and hydrodynamic inlet curve 38 toward relatively rotatable surface 6) the combined effects of tolerance accumulation, thermal expansion, and sealing material displaced by the confinement provided by the gland.

One important feature that minimizes seal volume is rebated surface 34, which in this embodiment is shown to be substantially parallel to static sealing surface 14, however the parallel relationship that is illustrated is not intended to be limiting the scope of the invention, because rebated surface 34 can also be oriented in skewed relationship with static sealing surface 14, as shown in FIGS. 9–9A. Another important feature that minimizes seal volume is the incorporation of unconstrained geometry 40 at a relatively steep angle "A" relative to dynamic sealing surface 18 and relatively rotatable surface 6. Angle "A" should be greater than 30 degrees, and preferably angle "A" should be in the range of 40 to 45 degrees. This provides room for a large amount of material displacement due to thermal expansion, initial compression, and tolerances compared to prior art Kalsi Seals. It is desired that seal 2 remain functional over a range of coefficient of thermal expansion ranging from 0.00027 to 0.00039 cubic inches per cubic inch per degree Fahrenheit.

The dimensional relationships desired in the present invention can be expressed mathematically using the following variables:

As Area of the longitudinal seal cross-sectional shape at the average width of the uninstalled sealing lip at room temperature, with the cross-section being taken on a cutting plane which passes through the longitudinal axis of the seal.

C Three-dimensional coefficient of thermal expansion, of the seal material used to construct the seal.

D Room temperature uninstalled depth of the seal body cross-section, from static sealing surface 14 to dynamic sealing surface 18.

DG The distance between relatively rotatable surface 6 and peripheral groove wall 4 at room temperature.

Dm Mean diameter of the uninstalled seal cross-section at room temperature; i.e. (inside diameter+outside diameter)/2.

E Depth of the uninstalled first seal body end 26 at room temperature.

G Room temperature gland volume, using the explicit definition of "gland" that was defined above in this document.

L Room temperature uninstalled width of the seal cross-section, as measured from first seal body end 26 to second seal body end 28.

LG The distance between first groove wall 8 and second groove wall 10.

P The uninstalled projection of dynamic sealing lip 16 from first seal body end 26 to dynamic sealing surface 18 at room temperature.

Rg Room temperature volume of the groove, using the explicit definition of "groove" that was defined above in this document.

Rv An arbitrarily defined theoretical volume used to verify the design proportions of a seal of the present invention to assure accommodation of seal thermal expansion and material displaced by compression, that is calculated from the dimensions of the seal in question using the equation Rv=Dm×3.1416×L×D. This arbitrarily defined theoretical volume represents the volume of an imaginary ring of rectangular cross-section that has the same room temperature inside diameter, outside diameter, and width as the seal in question.

S Room temperature volume of the uninstalled seal i.e. the amount of space that the seal occupies at room temperature, as measured in cubic units. The seal volume S can be determined by any suitable method, such as by employing Archimedes' principle, wherein the volume of liquid displaced by an immersed object is equal to the volume of the object, or such as employing engineering software to calculate the volume of a computer-generated "solid model" representing the dimensions of the seal, or such as by hand calculation; for example by employing Pappus or Guldinus rules of volumetric calculation using the average cross-section of the seal.

XG Radial extrusion gap dimension between structure 20 and relatively rotatable surface 6 at room temperature.

For the purposes of this specification, "room temperature" shall be the standard and well known ASTM-specified testing room temperature for measuring and testing elastomers; i.e. 23±2° C. (73.4±3.6° F.).

One very basic specification of the present invention is that the room temperature volume "S" of the seal 2 should be less than the room temperature volume Rg of the generally circular seal groove 3. It is also fundamental that the gland volume G be greater than S+S×C×280 degrees Fahrenheit.

To assure sufficient void area within the gland to accommodate thermal expansion and material displaced by compression, etc., the average sectional area As of the seal, when divided by (L×D), should yield a quotient of less than 0.84.

To assure sufficient void volume within the gland to accommodate thermal expansion and material displaced by compression, etc., the volume S of the seal, when divided by Rv, should yield a quotient of less than 0.84, and the volume S of the seal, when divided by G, should yield a quotient of less than 0.85.

To assure constraint, D times L should be equal to or preferably greater than DG times LG.

To assure adequate constraint at operating temperature, width "L" is preferred to be equal to or greater than 90% of distance "LG", and preferably about 94% of distance "LG". Also, the room temperature installed distance from first seal body end 26 to second seal body end 28 should be greater than 0.95×LG, and preferably should substantially equal LG, and the installed distance from first seal body end 26 to second seal body end 28 at operating temperature should be substantially equal to LG.

It is an object of the present invention that the seal 2 have as-manufactured uncompressed proportions such that when installed and at operating temperature, it does not overfill the gland and induce interfacial contact pressure which is incompatible with hydrodynamic lubrication. It is another object of the invention that seal 2 be simultaneously in contact with both the first groove wall 8 and the second groove wall 10 at least during the steady state temperature achieved during operation and preferably at room temperature as well; i.e. that the first seal body end 26 be in contact with the first groove wall 8 and that the second seal body end 28 be in simultaneous contact with the second groove wall 10. The purpose of such contact during operation is to prevent skew-induced abrasive ingestion. The force resulting from the solid generally circular seal body 5 being compressed between the first groove wall 8 and the second groove wall 10 forces the second seal body end 28 into firm contact with the second groove wall 10 and supports the seal against circumferential compression-induced buckling that could otherwise occur. The environment side exclusion edge 30 of dynamic sealing surface 18 is thus held in the intended circular configuration and therefore can not generate a hydrodynamic wedging action with the environment 23 in response to relative rotary motion, and thereby functions as intended to exclude particulate contaminants from the dynamic sealing interface.

For optimum constraint of seal 2, first groove wall 8 and second groove wall 10 should be constructed within 35 degrees of parallel with one another, and preferably will be constructed substantially parallel with each other. Also, for optimum constraint of seal 2, first seal body end 26 and second seal body end 28 should be constructed within 35 degrees of parallel with one another, and preferably will be constructed substantially parallel with each other, and preferably matching the angle between first groove wall 8 and second groove wall 10. Also, for optimum constraint, orientation, and seal compression, the groove corner radii 70 and 72 should preferably be less than 15% of the result of dimension "DG" minus dimension "XG".

The spring effect over local length "U" of the solid generally circular seal body 5 of FIGS. 1 and 1A can be made relatively stiff compared to the resilient projecting spring elements shown in U.S. Pat. No. 5,873,576, which helps to minimize differential pressure-induced shuttling and twisting of the seal within the generally circular seal groove 3, and thereby helps to prevent abrasive ingestion.

One of the problems occasionally encountered with elastomeric seals is volumetric change (swelling or shrinkage) and other forms of elastomer degradation, such as softening and loss of material strength, that occur as a result of exposure to an incompatible environmental fluid. An example of such an incompatible environment would be an ester-based drilling fluid. In the present invention, since the second seal body end 28 establishes a sealing relationship with second groove wall 10 during operation, only a small portion of the seal is actually exposed to the environment, which helps to minimize elastomer degradation resulting from exposure to incompatible environmental fluids. (A lubricant can ordinarily be selected which is compatible with the elastomer, so that volumetric changes, and other forms of seal material degradation, do not ordinarily occur as a result of exposure to the lubricant.) To help assure the establishment of a sealed relationship between seal 2 and second groove wall 10, a small annular ridge 74 can be incorporated which projects from the second seal body end 28 for contacting and establishing sealed relation with second groove wall 10. It is preferred that annular ridge 74 be spaced away from dynamic sealing surface 18 by a dimension equal to or greater than ⅓×depth "D".

In downhole drilling applications, the ambient downhole pressure is extremely high due to the depth of the hole and the fluid weight. Since annular ridge 74 establishes sealed relation with second groove wall 10, downhole ambient pressure can act across the sealed area between annular ridge 74 and static sealing surface 14 to create a hydraulic force which holds second seal body end 28 in firm contact against second groove wall 10. This hydraulic force helps to prevent seal 2 from rotating in a counter-clockwise direction, with the counterclockwise direction visualized in reference to FIG. 1A. If seal 2 were allowed to rotate in the counter-clockwise direction, the environment side exclusion edge 30 would tend to become less heavily compressed against the relatively rotatable surface 6, and would be less efficient at excluding the environment 23.

Because the rebated surface 34 of the body of the seal 2 is in close proximity to, or preferably in contact with, peripheral groove wall 4, reaction of rebated surface 34 against peripheral groove wall 4 mechanically stabilizes the seal against clockwise twisting of the seal, per the teachings of commonly assigned U.S. Pat. No. 5,230,520, with the clockwise direction being visualized in reference to FIG. 1A.

Also, because the rebated surface 34 is in close proximity to, or in contact with, peripheral groove wall 4, no substantial lubricant volume exists between rebated surface 34 and peripheral groove wall 4, which eliminates the need for communication to that region, and thus eliminates the previously described problems associated with achieving lubricant communication past the resilient spring projections of U.S. Pat. No. 5,873,576.

The continuous circular nature of first seal body end 26 of the present invention makes the present invention more immune to skew-induced impingement wear compared to the prior art of U.S. Pat. No. 5,873,576. The lubricant side communication slots in certain embodiments of the seals of U.S. Pat. No. 5,873,576 contribute to seal distortion and resulting skew-induced impingement wear if the environment pressure is greater than the lubricant pressure. The continuous surface of the first seal body end 26 of the present invention provides continuous circular support, and thereby resists differential pressure induced skewing of the seal within the groove because there are no communication passages for sealing material to be forced into by environmental pressure.

Another stabilization feature of the present invention in downhole drilling applications is that during operation the first seal body end 26 of seal 2 establishes a sealing relationship with first groove wall 8, and second seal body end 28 establishes a sealing relationship with second groove wall 10. This means that the downhole ambient pressure can act across the sealed area between first groove wall 8 and second groove wall 10 to create a hydraulic force which holds rebated surface 34 in firm contact against peripheral groove wall 4. This hydraulic force prevents seal 2 from rotating in a counter-clockwise direction, with the counter-clockwise direction visualized in reference to FIG. 1A.

In prior art seals the projection of the dynamic seal lip from the generally rectangular seal body cross-section has been relatively small in order that the seal body can be relatively large; this construction was believed to be necessary to minimize the unsupported area of the dynamic sealing lip when exposed to an environment pressure which is greater than the lubricant pressure in order to minimize pressure-induced deflection of the lip. In such prior art seals, the seal body and the lip consume a large percentage of the gland volume when installed, particularly if inadvertently installed in a seal groove which contacts the lubricant end and environment end of the seal simultaneously. Consequently there would be little void space left within the gland to accommodate thermal expansion of the seal, and high interfacial contact pressure would result. When this has inadvertently happened in customer equipment, the thermal expansion has been known to completely flatten the prior art seal against the relatively rotatable surface, which negates the hydrodynamic lubrication aspects of the seal, and causes heavy wear.

The solid generally circular seal body 5 of FIGS. 1 and 1A acts as a spring over local length "U" and serves to hold the second seal body end 28 against the second groove wall 10 and establishes a contact pressure there-between which helps to prevent environmental particulates from collecting between the second seal body end 28 and the second groove wall 10. If particulate matter is allowed to build up between the second seal body end 28 and the second groove wall 10, it may build up unevenly, which can skew the seal locally and cause skew-induced abrasive ingestion.

Because of the relatively small depth "E" of the present invention compared to total depth "D", the interfacial contact pressure remains comparatively low even though the seal is simultaneously confined by first groove wall 8, second groove wall 10, peripheral groove wall 4 and relatively rotatable surface 6. In the present invention, it is preferred that the ratio of projection "P" divided by total depth "D" be greater than 0.3 and preferably about 0.45. It is also preferred that the ratio of projection "P" divided by depth "E" be greater than 0.75 and preferably about 0.8.

Because of the ratio of depth "E" to total depth "D" on prior art seals, the interfacial contact pressure can become relatively large if the prior art seal were to be constrained between the lubricant side gland wall and the environment side gland wall and then taken to operating temperature. (Operating temperature is always higher than ambient temperature because of self-generated heat resulting from lubricant shear in the dynamic sealing interface.) This is because the solid generally circular seal body 5 acts as a compression spring over local length "U", and in the prior art seals the proportionately larger depth "E" increases the transverse area of the body and the effective compression spring load, compared to the present invention. This is because when elastic members are compressed, the compressive load is related to the percentage deflection times the modulus of the material times the area of the member.

The depth "E" of the first seal body end 26 comprises a relatively small percentage of the total depth "D" of seal 2, compared to prior art hydrodynamic seals, and the projection "P" of dynamic sealing lip 16 from the body of seal 2 is relatively large compared to depth "F" of the first seal body end 26. This construction maximizes volume of cross-sectional void 42 relative to the room temperature volume of seal 2, thereby providing adequate room for thermal expansion of seal 2, and providing adequate room for seal material displaced by compression of seal 2. This permits the seal to successfully operate without overfilling the seal gland, and without over-compressing dynamic sealing lip 16 against relatively rotatable surface 6 even though being simultaneously confined by first groove wall 8, second groove wall 10, peripheral groove wall 4 and relatively rotatable surface 6. If cross-sectional void 42 were not provided, the seal 2 could overfill the gland, which would dramatically increase interfacial contact pressure, which would have a significant negative effect on the dynamic performance of seal 2.

The proportionately small dimension of depth "E" of the solid generally circular seal body 5 effectively makes the solid generally circular seal body 5 have a lighter construction than the prior art, which reduces the effective compressive load generated by the solid generally circular seal body 5 when confined between first groove wall 8 and second groove wall 10. Since a portion of the compressive force between first groove wall 8 and second groove wall 10 contributes to contact pressure at the dynamic sealing interface, depth "E" can be used to regulate such interfacial contact pressure, and thus regulate lubricant film thickness between the seal and the relatively rotatable surface. The result of depth "E" divided by depth "D" should be less than 0.7, and preferably should be about 0.55.

The confinement of the solid generally circular seal body 5 by the groove is relied upon to support the dynamic sealing lip 16 against differential pressure induced deflection when the pressure of the environment 23 exceeds the pressure of the lubricant 22. The effectiveness of this approach was not obvious prior to finite element analysis and testing, and was contrary to expectations and prior engineering judgement.

The seal of the present invention is designed so that variations in width "L" occurring as a result of tolerances, thermal expansion, and variable compression do not cause such a high level of interfacial contact pressure at the dynamic sealing interface between dynamic sealing surface 18 and relatively rotatable surface 6 that it would be incompatible with hydrodynamic lubrication of the dynamic sealing interface. According to finite element analysis, the peak interfacial contact pressure of the present invention is greater than the prior art at high temperature, but several design steps have been taken to insure that the contact pressure is still compatible with hydrodynamic lubrication.

As can be seen in the fragmentary longitudinal cross-sectional illustration of FIG. 1, the intersection of unconstrained geometry 40 and dynamic sealing surface 18 is blended by a hydrodynamic inlet curve 38 which is preferably tangent to both. For orientation purposes, it should be understood that in the longitudinal cross-section of FIGS. 1 and 1A, the cutting plane of the cross-section passes through and is aligned with the longitudinal axis of the seal. In the preferred embodiment of the present invention, the hydrodynamic inlet curve 38, as viewed in longitudinal cross-section, is larger than has been employed in those prior art seals which define a hydrodynamic inlet curve when viewed in longitudinal cross-section.

Hydrodynamic inlet curve 38 preferably has a rate of curvature that is greater than the rate of curvature of a ⅛ inch radius, thereby providing a curve which is larger than a ⅛ inch radius (The rate of curvature measures how fast a curve bends. For example, a circle has a constant rate of curvature because it always is turning at the same rate; a smaller circle has a higher rate of curvature than a larger circle because it turns faster. For example the rate of curvature of a ¼ inch radius is less than the rate of curvature of a ⅛ inch radius, while the curve of a ¼ inch radius is greater than the curve of a ⅛ inch radius). Hydrodynamic inlet curve 38 may take any suitable form for producing hydrodynamic wedging without departing from the spirit or scope of the invention, such as a radius, a portion of an ellipse, a portion of a sine wave curve, a portion of a parabolic curve, a portion of a cycloid curve, a portion of witch/versiera curves, or combinations thereof. If hydrodynamic inlet curve 38 were incorporated as a portion of an ellipse, it would be preferred that the average of the major and minor elliptical axes should be greater than ⅛ inch and preferably 5/32 inch or larger.

When the seal 2 is compressed against the against relatively rotatable surface 6, hydrodynamic inlet curve 38 is intended to provide a gradually converging relationship with relatively rotatable surface 6 for efficient wedging of lubricant into the dynamic sealing interface between dynamic sealing surface 18 and relatively rotatable surface 6.

Kalsi Engineering, Inc. has performed extensive finite element analysis of hydrodynamic seals in order to understand the effect of seal geometry on contact pressure, and in order to understand the significance of contact pressure in regards to hydrodynamic and exclusionary performance. This analysis has shown that the size of hydrodynamic inlet curve 38 plays a crucial role in establishing an optimum contact pressure profile. To achieve an improved interfacial contact pressure profile over the prior art, hydrodynamic inlet curve 38, when viewed in longitudinal cross-section, should have a rate of curvature that is less than the rate of curvature of a ⅛ inch radius, thereby providing a curve which is larger than a ⅛ inch radius, and preferably should have a rate of curvature that is less than the rate of curvature of a 5/32 inch radius, thereby providing a curve which is larger than a 5/32 inch radius.

When such a relatively large hydrodynamic inlet curve 38 are employed, the tangency between hydrodynamic inlet curve 38 and dynamic sealing surface 18 in the uncompressed condition of the seal may come very close to the environment side exclusion edge 30 of dynamic sealing surface 18 at the narrowest width "W" of dynamic sealing surface 18. However, when the dynamic sealing lip 16 is compressed against relatively rotatable surface 6, width "W" spreads out wider and attains a usefully wide dimension because a significant portion of hydrodynamic inlet curve 38 becomes flattened against relatively rotatable surface 6 to become part of the effective dimension of width "W".

Figure 2:
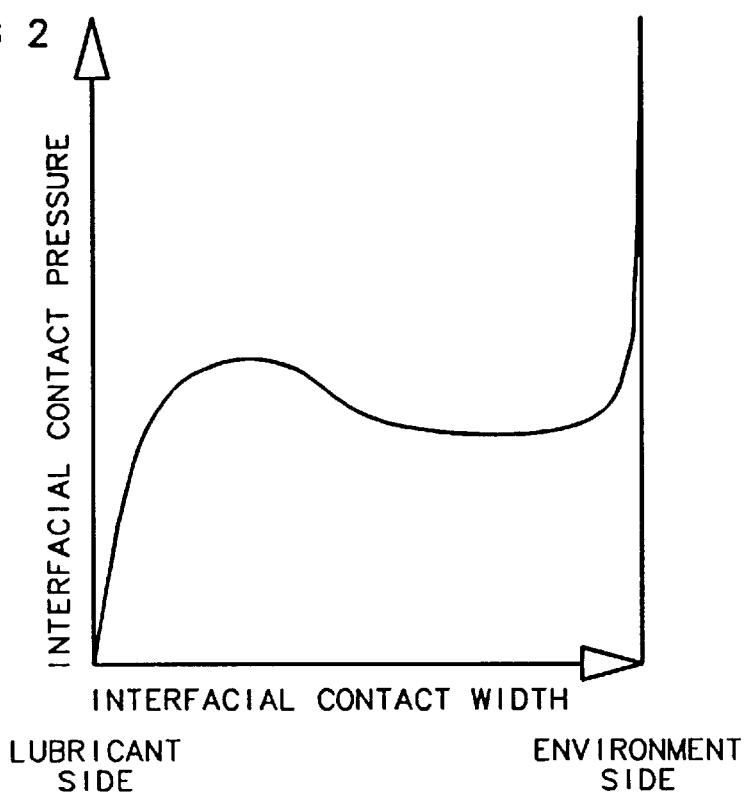
FIGS. 2 and 3 are graphical representations of finite element analysis predictions of the contact pressure that occurs at the interfacial contact footprint between the dynamic sealing lip and the relatively rotatable surface and which illustrate how interfacial contact pressure varies as a function of the dimension of the hydrodynamic inlet curve of the seal, with FIG. 2 being representative of the most commonly encountered hydrodynamic inlet curve of the prior art, and FIG. 3 being representative of the larger hydrodynamic inlet curve preferred for the present invention.
Figure 3:
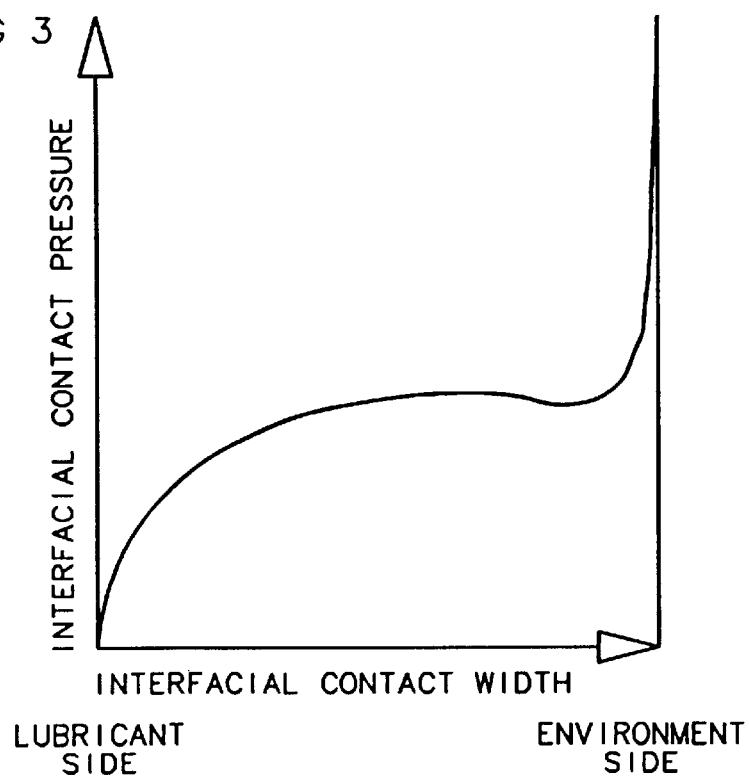

FIGS. 2 and 3 are graphs of finite element analysis predictions of the contact pressure that occurs at the interfacial contact footprint between the dynamic sealing lip 16 and the relatively rotatable surface 6, with the left side of the graphs being oriented towards the lubricant side of the interfacial contact footprint, and the right side of the graphs being oriented towards the environment side of the interfacial contact footprint. The graphs are included to illustrate how interfacial contact pressure varies as a function of the curvature of hydrodynamic inlet curve 38, with FIG. 2 being representative of the most commonly encountered hydrodynamic inlet curve of the prior art, and FIG. 3 being representative of the larger hydrodynamic inlet curve preferred for the present invention. Both graphs are representative of a seal at 300 degrees Fahrenheit, with the pressure of the environment 23 being 100 psi greater than the pressure of the lubricant 22. Both graphs are representative of interfacial contact predictions taken at a location that is aligned with the axis of the seal.

FIGS. 2 and 3 compare the contact pressure profiles of seals having different hydrodynamic inlet curvatures. The smaller hydrodynamic inlet curve of FIG. 2 produces an undesirably steep lubricant-side contact pressure slope, and a distinct saddle shape. The larger hydrodynamic inlet curve of FIG. 3 produces a more gradual lubricant side slope, and very little "saddle"; i.e. a very desirable contact pressure profile. Analysis and testing indicates that it is very desirable for the curve of hydrodynamic inlet curve 38 to be larger than that of ⅛ inch radius in order to obtain an optimum interfacial contact pressure profile and enhanced lubrication of the sealing interface. Analysis shows that the contact pressure profile is similar to FIG. 3 for curves spanning the range from 0.13 inch radius to 0.19 inch radius, with 0.19 inch radius being the largest radius analyzed.

As can be seen from FIG. 3, the larger hydrodynamic inlet curve 38 preferred for the present invention provides a very gradual rise in interfacial contact pressure from the lubricant side to near the environment side of the dynamic sealing interface, and produces an increase in interfacial contact pressure at the environment side of the dynamic sealing interface. This optimized contact pressure profile provides enhanced hydrodynamic lubrication, as verified by lower torque signatures observed in comparison testing of seals having large versus small hydrodynamic inlet curves. The large hydrodynamic inlet curve 38 of the preferred embodiment produces a stronger wedging action by virtue of providing a more gradual convergence between the seal 2 and the relatively rotatable surface 6.

This is particularly important in the seals of the present invention, which tend to have generally higher interfacial contact pressure owing to the increased confinement of the present invention resulting from the seal being simultaneously confined by first groove wall 8, second groove wall 10, peripheral groove wall 4 and relatively rotatable surface 6.

The advantages of the larger hydrodynamic inlet curve 38 of the present invention also provide an advantage to seals which are not constrained by the walls of the groove, as discussed herein in conjunction with FIGS. 5–8. The advantage of the larger hydrodynamic inlet curve is also considered to be important in hydrodynamic seals where the pressure of the environment 23 is higher than the pressure of the lubricant 22, because the lubricant side contact pressure can tend to increase under reverse pressure, which can tend inhibit hydrodynamic action.

From FIG. 2 one can also observe that smaller hydrodynamic inlet curve of the prior art produces less interfacial contact pressure in the middle of the interfacial contact footprint compared to near the lubricant edge; this adverse phenomenon is almost entirely absent when the larger hydrodynamic inlet curve of the present invention is used, as shown in FIG. 3, which means the larger hydrodynamic inlet curve is more effective as a hydrodynamic inlet.

Referring again to FIGS. 1 & 1A, the preferred embodiment of the present invention also incorporates a flexible transitional heel 44 for achieving increased contact pressure at the environment side exclusion edge 30 of dynamic sealing surface 18 per the general teachings of U.S. Pat. No. 5,738,358, which is titled "Extrusion resistant hydrodynamically lubricated multiple modulus rotary shaft seal". The flexible transitional heel 44 is defined by the dynamic sealing lip 16 and extends from the circular environment side exclusion edge 30 to a circular corner 46 which is defined at the intersection of the flexible transitional heel 44 with second seal body end 28. The flexible transitional heel 44 has circular intersection with second seal body end 28 remote from dynamic sealing surface 18, and has circular intersection with dynamic sealing surface 18 remote from second seal body end 28. Because of the circular configuration of environment side exclusion edge 30, the seal does not generate a hydrodynamic wedging action with the environment in response to relative rotary motion, and thereby functions to exclude particulate contaminants from the dynamic sealing interface per the teachings of U.S. Pat. No. 4,610,319. The exclusionary function of environment side exclusion edge 30 is amplified by the flexible transitional heel 44 because the overhanging seal body material of length 48 experiences compression which is reacted to relatively rotatable surface 6, thereby increasing interfacial contact pressure at environment side exclusion edge 30. The interfacial contact pressure adjacent to environment side exclusion edge 30 can be regulated by controlling the length 48 and depth 50 of the flexible transitional heel 44. The specific shape of flexible transitional heel 44 can vary from the specific geometry shown without departing from the spirit or scope of the present invention.

The confinement of seal 2 between first groove wall 8 and second groove wall 10 creates an extruding force which would, in the absence of flexible transitional heel 44, tend to push sealing material into extrusion gap "XG". The flexible transitional heel 44 of the preferred embodiment provides the seal with an advantage because the extruding force imposed by the confinement of seal 2 between first groove wall 8 and second groove wall 10 tends to cause transitional flexible transitional heel 44 to flex toward the extrusion gap "XG", rather than tending to cause it to extrude or bulge into the extrusion gap "XG" to the extent that it becomes damaged by the generally unavoidable dynamic variations in the dimension of extrusion gap "XG". The seal is therefore protected from fatigue damage which can occur from being forced past the sharp, potentially rough seal groove corner 54 and into extrusion gap "XG".

Any seal material forced to extrude or bulge into extrusion gap "XG" could be subjected to a high level of stress as the dimension of extrusion gap "XG" changes due to dynamic lateral shaft motion, because the dimensional change can be very large compared to the size of the extruded material. For example, the local extrusion gap can vary dynamically due to shaft runout, which can impose thousands of fatigue cycles on the extruded material in a very short period of time. With the preferred embodiment, as the dimension of extrusion gap "XG" changes, the flexible transitional heel 44 absorbs the lateral movement over the distance between length 48 and depth 50, which is a relatively long distance (compared to the dimension of extrusion gap "XG") so the average strain is kept below the fatigue limit of the seal material. For best results in seals constructed from a single material, in order to keep the flexible transitional heel 44 from being compressed flat against the shaft, it is desirable that angle 56 be less than 45 degrees, and preferably less than or equal to 30 degrees, and it is preferable that depth 50 be greater than the initial installation compression of the seal.

Since the second seal body end 28 of seal 2 has substantially the same shape as the second groove wall 10, and since the extrusion gap "XG" between structure 2 and relatively rotatable surface 6 can be maintained at a small dimension if desired, the seal of the present invention is also well suited for service conditions where the pressure of the lubricant 22 is significantly greater than that of the environment 23, because the seal is generally well supported by against the differential pressure by the second groove wall 10 at all locations (except extrusion gap "XG") in a manner that tends to resist distortion and extrusion of seal material, and the general shape of the seal is therefore not distorted by the differential pressure acting over it. Extrusion gap "XG" should be less than 15% of distance "DG, and it is preferably less than $\frac{1}{32}$", for low pressure or zero pressure applications, and smaller for high pressure applications.

As will be readily apparent to those skilled in the art, the present invention may be produced in other specific forms without departing from its spirit or essential characteristics. The present embodiments are therefore to be considered as illustrative and not restrictive.

Figure 4:
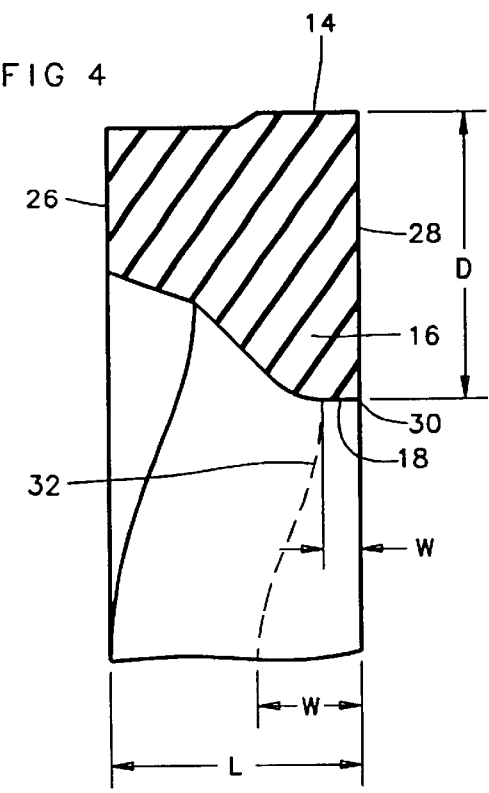
FIG. 4 is a partial longitudinal sectional view showing a seal oriented for radial sealing and having the dynamic sealing lip thereof located on the inner periphery for sealing against a substantially cylindrical relatively rotatable surface such as a shaft.
Figure 4A:
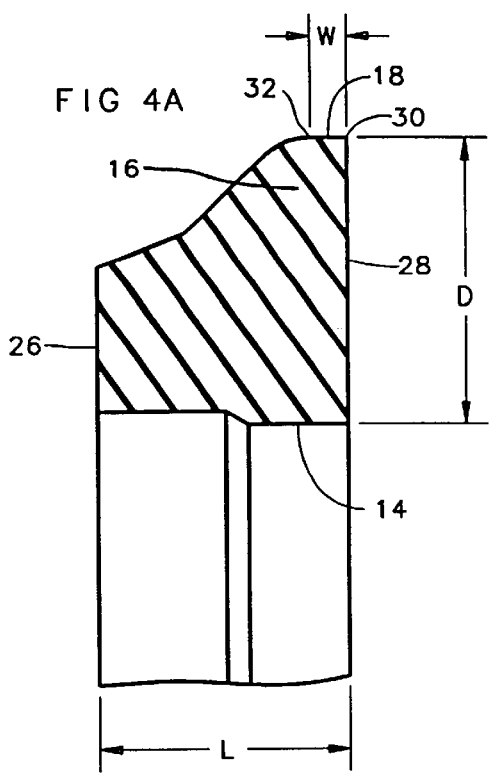
FIG. 4A is a partial longitudinal sectional view showing a seal oriented for radial sealing and having the dynamic sealing lip located on the outer periphery thereof for sealing against a substantially cylindrical relatively rotatable surface such as a housing bore.
Figure 4B:
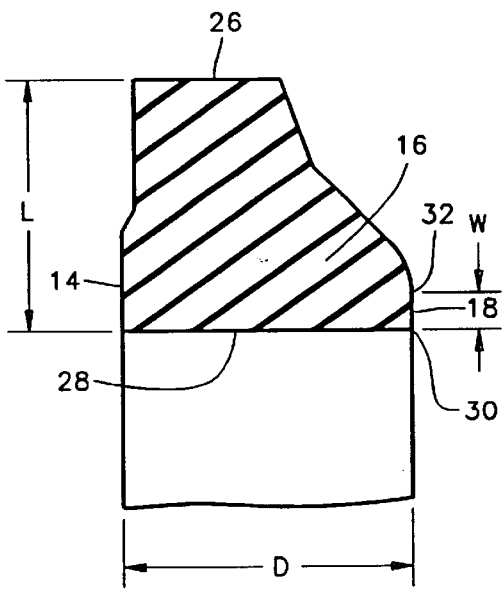
FIGS. 4B & 4C are partial longitudinal sectional views showing seals oriented for axial (face) sealing and having the dynamic sealing lip thereof located in an axial orientation for sealing against a substantially planar relatively rotatable surface such as the shoulder of a shaft.
Figure 4C:
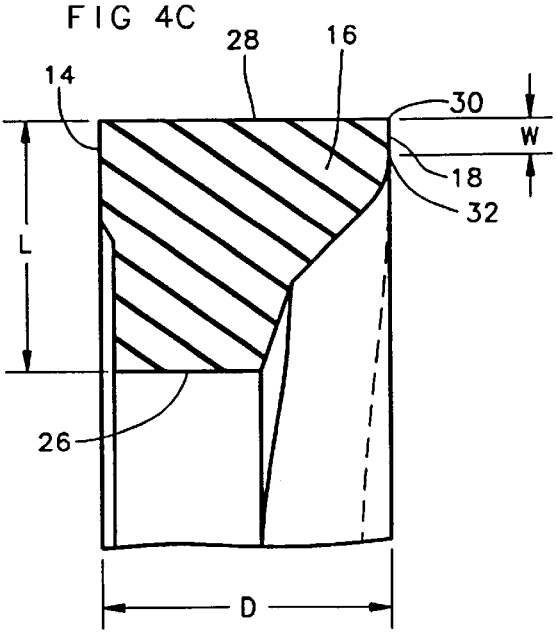

Description of the Simplified Alternative Embodiments of FIGS. 4–4C

Referring now to FIGS. 4–4C, bi-directional hydrodynamically lubricated generally circular compression-type rotary shaft seals representing alternative embodiments of the present invention are shown in their uncompressed state. The seals of FIGS. 4–4C are adapted to be received within a circular seal gland defined by first and second spaced seal groove walls, a peripheral groove wall, and a relatively rotatable surface. The seals of FIGS. 4–4C are a simplification of the preferred embodiment of FIGS. 1 & 1A which do not incorporate the flexible transitional heel 44, the large hydrodynamic inlet curve 38, or the annular ridge 74 of the preferred embodiment, and instead incorporate the smaller hydrodynamic inlet curve used in the prior art. For orientation purposes, it should be understood that in the longitudinal cross-section of FIGS. 4–4C, the cutting plane of the cross-section passes through the longitudinal axis of the seal. As with the seal of FIGS. 1 & 1A, the environment side exclusion edge 30 of dynamic sealing surface 18 is circular for exclusionary purposes in the seals of FIGS. 4–4C.

FIGS. 4 and 4A are oriented for radial sealing and FIGS. 4B & 4C are oriented for axial (face) sealing. Total depth "D" and width "L" are shown in FIGS. 4–4C for orientation purposes. Note that the lubricant side edge 32 of dynamic sealing surface 18 of the seals of FIGS. 4–4C is non-circular for hydrodynamic lubrication purposes, per the teachings of U.S. Pat. No. 4,610,319, and therefore local width "W" of the dynamic sealing surface 18 varies about the circumference of the seals.

FIG. 4 shows a seal oriented for radial sealing and having the dynamic sealing lip 16 located on the inner periphery for sealing against a substantially cylindrical relatively rotatable surface such as a shaft. The static sealing surface 14 and the dynamic sealing surface 18 may be of substantially cylindrical configuration, as shown, and the first seal body end 26 and the second seal body end 28 may be of substantially planar configuration, as shown. Dynamic sealing lip 16 projects from said solid generally circular seal body 5 in a substantially radial direction.

FIG. 4A shows a seal oriented for radial sealing and having the dynamic sealing lip 16 located on the outer periphery for sealing against a substantially cylindrical relatively rotatable surface such as a housing bore. The static sealing surface 14 and the dynamic sealing surface 18 may be of substantially cylindrical configuration, as shown, and the first seal body end 26 and the second seal body end 28 may be of substantially planar configuration, as shown. Dynamic sealing lip 16 projects from said solid generally circular seal body 5 in a substantially radial direction.

FIGS. 4B and 4C show seals oriented for axial (face) sealing and having the dynamic sealing lip 16 located in an axial orientation for sealing against a substantially planar relatively rotatable surface such as the shoulder of a shaft. The static sealing surface 14 and the dynamic sealing surface 18 may be of substantially planar configuration, as shown, and the first seal body end 26 and the second seal body end 28 may be of substantially cylindrical configuration, as shown. In FIG. 4B, the dynamic sealing lip 16 is oriented for applications having a lubricant located exterior of the dynamic sealing lip 16. In FIG. 4C, the dynamic sealing lip 16 is oriented for applications having a lubricant located interior of the dynamic sealing lip 16. In both figures, dynamic sealing lip 16 projects from said solid generally circular seal body 5 in a substantially axial direction.

Description of the Simplified Alternative Embodiments of FIGS. 5–8

Referring now to FIGS. 5–8, bi-directional hydrodynamically lubricated generally circular compression-type rotary shaft seals representing alternative embodiments of the present invention are shown in their uncompressed state. The seals of FIGS. 5–8 are adapted to be received within a circular seal gland defined by first and second spaced seal groove walls, a peripheral groove wall, and a relatively rotatable surface. The seals of FIGS. 5–8 are simplified versions of the preferred embodiment of FIGS. 1 & 1A that do not incorporate the body and dynamic sealing lip proportions of the preferred embodiment, or the annular ridge, but which do employ the large hydrodynamic inlet curve 38 of the preferred embodiment to obtain a more optimal interfacial contact pressure profile, compared to the prior art. (Because the seals of FIGS. 5–8 do not incorporate the body and dynamic sealing lip proportions of the preferred embodiment, they are not considered to be suitable for simultaneous contact with the relatively rotatable surface and all 3 groove walls under the normal range of differential thermal expansion and tolerances.) FIGS. 7 and 8 are further simplified by omitting the flexible transitional heel 44 of the preferred embodiment, and FIGS. 6 and 8 are further simplified by omitting the rebated surface 34 of the preferred embodiment.

For orientation purposes, it should be understood that in the longitudinal cross-section of FIGS. 5–8, the cutting plane of the cross-section passes through the longitudinal axis of the s seal. As with the preferred embodiment, in the seals of FIGS. 5–8 the hydrodynamic inlet curve 38, when viewed in longitudinal cross-section, should be larger than $1/8$ inch radius and preferably larger than a $5/32$ inch radius. When such a relatively large hydrodynamic inlet curve 38 is employed, the tangency between hydrodynamic inlet curve 38 and dynamic sealing surface 18 in the uncompressed condition of the seal can come very close to the environment side exclusion edge 30 of dynamic sealing surface 18 at the narrowest width "W" of dynamic sealing surface 18. However, when the dynamic sealing lip 16 is compressed against a relatively rotatable surface, the width "W" spreads out wider and attains a usefully wide dimension due to flattening of dynamic sealing lip 16 as a result of the compression, causing a portion of hydrodynamic inlet curve 38 to become flattened against the relatively rotatable is surface to become part of the effective dimension of width "W".

Even though the seals of FIGS. 5–8 are greatly simplified compared to the preferred embodiment, by incorporating the large hydrodynamic inlet curve 38 of the preferred embodiment, these seals are able to take advantage of the optimal interfacial contact pressure profile discussed in conjunction with the preferred embodiment. This provides the seals with a more efficient hydrodynamic wedging action, compared to the prior art, which enables them to run at lower torque than the prior art under similar operating conditions, and which enables them to maintain adequate lubrication at high pressure while using thinner lubricants or higher initial compression.

Description of the Alternative Embodiment of FIGS. 9–9A

Referring now to FIGS. 9 and 9A, there are shown two views that represent an alternative embodiment of this invention. FIGS. 9 and 9A are fragmentary longitudinal cross-sectional illustrations of a hydrodynamically lubricated interference-type rotary shaft seal 2, with FIG. 9 showing the uninstalled condition of the seal 2, and with FIG. 9A illustrating the installed condition of the seal 2 compressed in sealing relation against peripheral groove wall 4 and against relatively rotatable surface 6, and secured in skew resisting confinement between first groove wall 8 and second groove wall 10. When installed, rebated surface 34 is in close proximity or in contact with peripheral groove wall portion 66.

It has previously been discussed in conjunction with FIGS. 1 and 1A that rebated surface 34 serves the important function of minimizing seal volume, so that there is less volumetric thermal expansion to contend with. In the embodiment of FIGS. 9 and 9A, rebated surface 34 is oriented in skewed relationship with static sealing surface 14 and relatively rotatable surface 6, and oriented such that angle 64 is greater than 90 degrees, so that the seal has even less material volume than the embodiment shown in FIGS. 1 and 1A. Correspondingly, a peripheral groove wall portion 66 is skewed in relation to peripheral groove wall 4, and forms angle 64 with respect to first groove wall 8 which is greater than 90 degrees. The embodiment of FIGS. 9 and 9A has the advantage of having less seal material, so it has less volumetric thermal expansion compared to FIGS. 1 and 1A. This means that angle "A" can be less than shown in FIG. 1, providing more support for dynamic sealing lip 16 when the pressure of environment 23 is higher than the pressure of lubricant 22.

Description of the Alternative Embodiment of FIGS. 10

FIG. 10 illustrates an alternative embodiment of the invention in the uncompressed configuration wherein a hydrodynamic seal 2 is shown that is nearly identical in external geometry to the embodiment shown in FIG. 1, but differs in material of construction. The difference between this embodiment and that of FIG. 1 is that this embodiment is a composite of two complimentary materials, rather than being made entirely from one material. The first resilient material composing first length 60 is made from one material, and the second resilient material composing second length 62 is made from a different material. The material composing second length 62 can be a relatively hard material selected for it's dynamic sealing properties, such as abrasion resistance, and having higher stiffness than the material composing first length 60. The material composing first length 60 can be a relatively softer material of relatively low stiffness, such as an elastomer having a 40–80 durometer Shore A hardness, that provides a lower axial spring force when confined by the first and second groove walls (compared to a seal made entirely out of the harder material). The material composing first length 60 can also be a material comprised of bonded or sintered together strands or particles of resilient material having voids interspersed throughout to provide lowered stiffness, such as a porous fibrous material, such that the effective stiffness or spring rate of the material is less than if the material comprising first length 60 were constructed of the exact same material, but in nonporous form. Since a portion of the compressive force between the first groove wall and second groove wall contributes to contact pressure at the dynamic sealing interface, the dimensions, modulus and spring rate of the material composing first length 60 can be used to regulate such interfacial contact pressure, and thus regulate lubricant film thickness between the seal and the relatively rotatable surface. The interface 80 between the two materials can take any suitable form without departing from the spirit or scope of the invention, including the substantially straight interface shown, or any manner of curved interface.

It can be appreciated that if the material composing first length 60 is a material comprised of bonded or sintered together strands or particles of resilient material having voids interspersed throughout, such as a porous fibrous material, such that the voids will provide room to accommodate thermal expansion of the seal; this means that there is less necessity for other methods of providing room for thermal expansion, such as providing a very large dynamic lip projection, and providing a rebated surface, etc.

Figure 11:
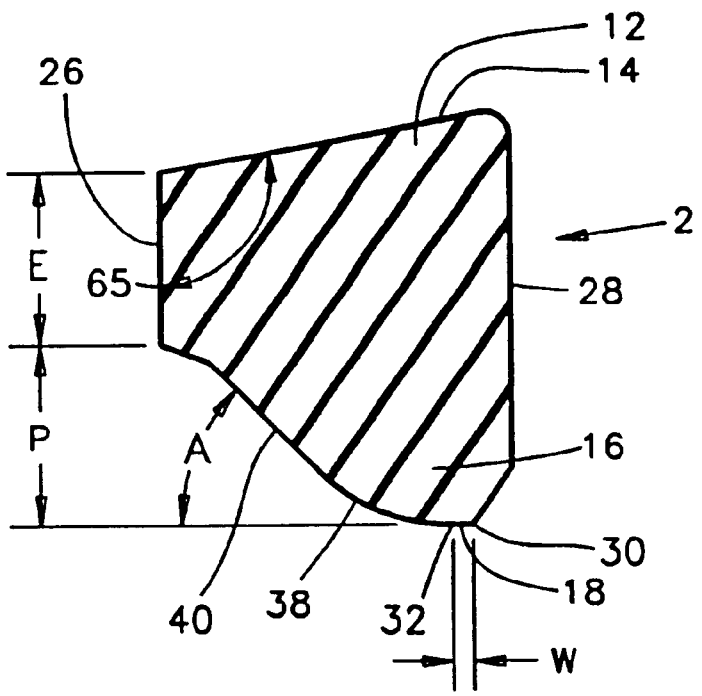
FIGS. 11 and 11A are partial longitudinal sectional views showing a hydrodynamically lubricated interference type seal representing another embodiment of the present invention, with FIG. 11 showing the uncompressed condition of the seal and FIG. 11A showing the seal in its radially compressed state within a circular seal gland.
Figure 11A:
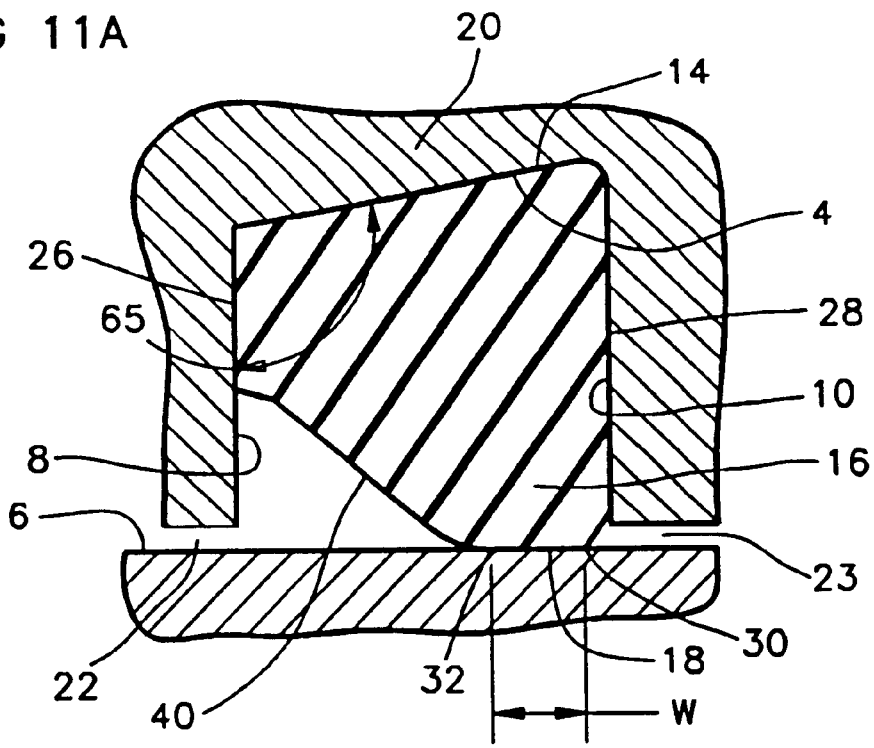

Description of the Alternative Embodiment of FIGS. 11–11A

Referring now to FIGS. 11 and 11A, there are shown two views that represent an alternative embodiment of this invention which is slightly different than the seals of FIGS. 9 and 9A. FIGS. 11 and 11A are fragmentary longitudinal cross-sectional illustrations of a hydrodynamically lubricated interference-type rotary shaft seal 2, with FIG. 11 showing the uninstalled condition of the seal 2, and with FIG. 11 A illustrating the installed condition of the seal 2 compressed in sealing relation between peripheral groove wall 4 and relatively rotatable surface 6, and secured in skew resisting confinement between first groove wall 8 and second groove wall 10.

In the embodiment of FIGS. 9 and 9A, rebated surface 34 is oriented in skewed relationship with dynamic sealing surface 18 and relatively rotatable surface 6, and oriented such that angle 64 is greater than 90 degrees, so that the seal has less material volume than the embodiment shown in FIGS. 1 and 1A. Correspondingly, in FIGS. 11–11A, the static sealing surface 14 and the peripheral groove wall 4 are skewed in relation to relatively rotatable surface 6 and in relation to dynamic sealing surface 18, and forms angle 65 with respect to first groove wall 8 and first seal body end 26 which is greater than 90 degrees. The embodiment of FIGS. 11 and 11A has the advantage of having less seal material, so it has less volumetric thermal expansion compared to FIGS. 1 and 1A. This means that angle "A" can be less than shown in FIG. 1, providing more support for dynamic sealing lip 16 when the pressure of environment 23 is higher than the pressure of lubricant 22.

As in the preferred embodiment of FIGS. 1 & 1A, the alternate embodiments of FIGS. 9–11A incorporate a static sealing lip 12 in generally opposed relation to a dynamic sealing lip 16, and a static sealing surface 14 in generally opposed relation to dynamic sealing surface 18, which has a variable width "W" defined by a environment side exclusion edge 30 on the environment side and defined by a lubricant side edge 32 on the lubricant side. Likewise, the embodiments of FIGS. 9–11A have a first seal body end 26 of dimension "E" and have a dynamic sealing lip 16 projecting by dimension "P". During operation first seal body end 26 contacts first groove wall 8, and second seal body end 28 contacts second groove wall 10, thereby constraining the seals against skew-induced abrasion. Likewise, hydrodynamic inlet curve 38 blends unconstrained geometry 40 and dynamic sealing surface 18.

This invention, as disclosed in conjunction with FIGS. 1–11A, has application where relatively rotatable surfaces are sealed with respect to a structure 20 with either the structure 20 or the relatively rotatable surface 6, or both, being the rotary member. The dynamic sealing surface 18 and the generally opposed static sealing surface 14 can be on the inside and outside of the seal cross-sectional shape when the seal is compressed in the radial direction between substantially cylindrical counter-surfaces, with the dynamic sealing surface 18 being located on either the inner or the outer periphery, and the static sealing surface 14 being located on the opposite periphery. Alternatively, the dynamic sealing surface 18 and the generally opposed static sealing surface 14 can be on opposite ends of the seal cross-sectional shape when the seal is compressed in an axial direction between relatively rotating substantially planar counter-surfaces.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A rotary seal device comprising:
   a generally ring-shaped interference-type rotary seal (2) defining a seal volume ("S") and defining a mean seal diameter ("Dm") and further comprising:
   i. a solid generally circular seal body (5) composed of sealing material and defining a first seal body end (26) and a second seal body end (28);
   ii. a static sealing surface (14) being defined by said solid generally circular seal body (5),
   iii. at least one compression-type dynamic sealing lip (16) projecting from said solid generally circular seal body (5) by a projection dimension (P) and being oriented in generally opposed relation to said static sealing surface (14), and defining a dynamic sealing surface (18) having a variable width,
   iv. said compression-type dynamic sealing lip (16) providing a non-circular shape for rotation-induced hydrodynamic lubrication of said dynamic sealing surface (18),
   v. said static sealing surface (14) being separated from said dynamic sealing surface (18) by a seal depth (D), and said first seal body end (26) being separated from said second seal body end (28) by a seal width (L);
   vi. said seal volume (S), when divided by the product of seal width (L) times said seal depth (D) times said mean seal diameter (Dm) times 3.1416, yields a quotient of less than 0.84.

2. The rotary seal device of claim 1, further comprising:
   said projection dimension ("P") being at least 30% of said seal depth (D).

3. The rotary seal device of claim 1, further comprising:
   (a) said first seal body end (26) having a depth dimension ("E"),
   (b) said projection dimension ("P") of said compression-type dynamic sealing lip (16) being at least 75% of said depth dimension ("E") of said first seal body end (26).

4. The rotary seal device of claim 1, further comprising:
   (a) said solid generally circular seal body (5) defining a theoretical center-line; and
   (b) a hydrodynamic inlet curve (38) having an average rate of curvature being defined by said compression-type dynamic sealing lip (16) when said hydrodynamic inlet curve (38) is viewed in a longitudinal cross-section taken along said theoretical center-line;
   (c) said average rate of curvature of said hydrodynamic inlet curve (38) being less than the rate of curvature of a ⅛-inch radius.

5. The rotary seal device of claim 4, further comprising:
   said average rate of curvature of said hydrodynamic inlet curve (38) being less than the rate of curvature of a 5/32-inch radius.

6. The rotary seal device of claim 1, further comprising:
   (a) a rebated surface (34) being defined by said solid generally circular seal body (5) for minimizing volume of said interference-type rotary seal (2), said rebated surface (34) defining a static sealing lip (12),
   (b) said static lip (12) being in substantially opposed relation to said dynamic sealing lip (16).

7. The rotary seal device of claim 6, further comprising:
   said rebated surface (34) being oriented in respect to said first seal body end (26) by an angle greater than 90 degrees.

8. The rotary seal device of claim 1, further comprising:
   said static sealing surface (14) being oriented in respect to said first seal body end (26) by an angle greater than 90 degrees.

9. The rotary seal device of claim 1, further comprising:
   at least one annular ridge (74) projecting from said second seal body end (28).

10. The rotary seal device of claim 1, further comprising:
    (a) said interference-type rotary seal (2) being comprised of a first length (60) and a second length (62),
    (b) said first length (60) being adjacent to said first seal body end (26), and said second length (62) being adjacent to said second seal body end (28),
    (c) said first length (60) being comprised of a first resilient material having a first stiffness,
    (d) said second length (62) being comprised of a second resilient material having a second stiffness, said second stiffness being greater than said first stiffness of said first resilient material;
    (e) said compression type dynamic sealing lip (16) being defined by said second resilient material.

11. The rotary seal device of claim 10, further comprising:
    said first resilient material being a porous material.

12. The rotary seal device of claim 10, further comprising:
    said first resilient material being a fibrous material.

13. The rotary seal device of claim 1, further comprising:
    a structure (20) having a generally circular seal groove (3) defined by a first groove wall (8), by a second groove wall (10) being in spaced relation to said first groove wall (8), and by a peripheral seal groove wall (4), said generally circular seal groove (3) having a seal groove volume.

14. The rotary seal device of claim 13, further comprising:
    at least one annular ridge (74) projecting from said second seal body end (28) and contacting said second groove wall (10).

15. The rotary seal device of claim 14, further comprising:
    (a) said peripheral groove wall (4) and said relatively rotatable surface (6) being in radially spaced relation by a spaced radial relation dimension ("DG");
    (b) said spaced relation between said first groove wall (8) and second groove wall (10) defining a spacing dimension ("LG"); and
    (c) the result of (D)×(L) being equal to or greater than the result of (DG)×(LG) in the nominal untoleranced dimensions thereof.

16. The rotary seal device of claim 13, further comprising:
    (a) a relatively rotatable surface (6);
    (b) said generally circular seal groove (3) holding said interference-type rotary seal (2) in compression against said relatively rotatable surface (6); and
    (c) said first seal body end (26) being in contact with said first groove wall (8) and said second seal body end (28) being in contact with said second groove wall (10).

17. The rotary seal device of claim 16, further comprising:
(a) a seal gland having a seal gland volume being defined by said generally circular seal groove (3) and said relatively rotatable surface (6); and
(b) said seal volume ("S") being less than 85% of said seal gland volume.

18. The rotary seal device of claim 1, further comprising:
said interference-type rotary seal (2) being oriented for radial sealing whereby said static sealing surface (14) having a larger diameter than said dynamic sealing surface (18), and said compression-type dynamic sealing lip (16) projecting from said solid generally circular seal body (5) in a substantially radial direction.

19. The rotary seal device of claim 1, further comprising:
said interference-type rotary seal (2) being oriented for radial sealing whereby said dynamic sealing surface (18) having a larger diameter than said static sealing surface (14), and said compression-type dynamic sealing lip (16) projecting from said solid generally circular seal body (5) in a substantially radial direction.

20. The rotary seal device of claim 1, further comprising:
said interference-type rotary seal (2) being oriented for axial sealing whereby said first seal body end (26) having a larger diameter than said second seal body end (28), and said compression-type dynamic sealing lip (16) projecting from said solid generally circular seal body (5) in a substantially axial direction.

21. The rotary seal device of claim 1, further comprising:
said interference-type rotary seal (2) being oriented for axial sealing whereby said second seal body end (28) having a larger diameter than said first seal body end (26), and said compression-type dynamic sealing lip (16) projecting from said generally circular seal body (5) in a substantially axial direction.

22. The rotary seal device of claim 1, further comprising:
a flexible transitional heel (44) defined by said compression-type dynamic sealing lip (16) and having circular intersection with said second seal body end (28) remote from said dynamic sealing surface (18), and having circular intersection with said dynamic sealing surface (18) remote from said second seal body end (28).

23. The rotary seal device of claim 22, further comprising:
(a) said flexible transitional heel (44) being a chamfer defining a chamfer angle with respect to said second seal body end (28); and
(b) said chamfer angle being less than 31 degrees.

24. A generally ring-shaped interference-type rotary seal (2) comprising:
(b) a solid generally circular seal body (5) defining a first seal body end (26) and a second seal body end (28) and having a first length (60) comprised of a first material and being adjacent to said first seal body end (26), and having a second length (62) being comprised of a second material and being adjacent to said second seal body end (28);
(b) a static sealing surface (14) being defined by said second length (62) of said generally circular seal body (5);
(c) at least one compression-type dynamic sealing lip (16) projecting from said second length (62) of said solid generally circular seal body (5) and being oriented in generally opposed relation to said static sealing surface (14), and defining a dynamic sealing surface (18), said compression-type dynamic sealing lip (16) defining a non-circular lubricant side edge (32) and hydrodynamic inlet curve (38) that together form a wavy hydrodynamic inlet geometry providing for rotation-induced hydrodynamic lubrication of said dynamic sealing surface (18); and
(d) said first material being a porous material providing less stiffness than stiffness provided by said second material.

25. A rotary seal device having a generally ring-shaped interference-type rotary seal (2) defining a seal volume ("S") and defining a mean seal diameter ("Dm") and further comprising:
(a) a solid generally circular seal body (5) composed of sealing material and defining a theoretical center-line and defining a static sealing surface (14) and defining a second seal body end (28) and defining a first seal body end (26) separated from said second seal body end (28) by a seal width (L) and having a depth dimension ("E");
(b) a compression-type dynamic sealing lip (16) projecting from said solid generally circular seal body (5) by a projection dimension ("P") and being oriented in generally opposed relation to said static sealing surface (14), and defining a dynamic sealing surface (18) separated from said static sealing surface (14) by a seal depth (D), said compression-type dynamic sealing lip (16) providing for hydrodynamic lubrication of said dynamic sealing surface (18);
(c) said projection dimension ("P") being at least 30% of said seal depth (D) and being at least 75% of said depth dimension ("E");
(d) said seal volume (S), when divided by the product of seal width (L) times the seal depth (D) times the mean seal diameter (Dm) times 3.1416, yielding a quotient of less than 0.84;
(e) a hydrodynamic inlet curve (38) being defined by said compression-type dynamic sealing lip (16) and having an average rate of curvature less than the rate of curvature of a ⅛ inch radius when viewed in a longitudinal cross-section taken along said theoretical center-line;
(f) a rebated surface (34) being defined by said solid generally circular seal body (5) and being oriented relative to said first seal body end (26) by an angle greater than 90 degrees;
(g) a circular ridge (74) projecting from said second seal body end (28);
(h) a first length (60) being defined adjacent to said first seal body end (26) and having a first stiffness, and a second length (62) being defined adjacent to said second seal body end (28) and having a second stiffness which is higher than said first stiffness; and
(ii) a flexible transitional heel (44) being defined by said compression-type dynamic sealing lip (16) and having circular intersection with second seal body end (28) remote from dynamic sealing surface (18), and having circular intersection with dynamic sealing surface (18) remote from second seal body end (28).

26. A rotary seal device having a solid generally ring-shaped interference-type rotary seal (2) defining a seal volume ("S") and defining a mean seal diameter ("Dm") and further comprising:
(a) a solid generally circular seal body (5) composed of sealing material and defining a theoretical center-line and defining a static sealing surface (14) and defining a second seal body end (28) and defining a first seal body end (26) separated from said second seal body end (28) by a seal width (L) and having a depth dimension ("E");

(b) a compression-type dynamic sealing lip (16) projecting from said solid generally circular seal body (5) by a projection dimension ("P") and being oriented in generally opposed relation to said static sealing surface (14), and defining a dynamic sealing surface (18) separated from said static sealing surface (14) by a seal depth (D), said compression-type dynamic sealing lip (16) providing a non-circular shape for rotation-induced hydrodynamic lubrication of said dynamic sealing surface (18);

(c) said projection dimension ("P") being at least 30% of said seal depth (D) and being at least 75% of said depth dimension ("E");

(d) said seal volume (S), when divided by the product of seal width (L) times the seal depth (D) times the mean seal diameter Dm times 3.1416, yielding a quotient of less than 0.84; and (f) a hydrodynamic inlet curve (38) being defined by said compression-type dynamic sealing lip (16) and having an average rate of curvature less than the rate of curvature of a ⅛ inch radius when viewed in a longitudinal cross-section taken along said theoretical center-line.

27. A hydrodynamically lubricating seal assembly, comprising:

(a) a structure (20) defining a at least a portion of a lubricant chamber having a lubricant (22) therein, said structure having first and second spaced groove walls (8, 10) and a peripheral groove wall (4) defining a circular seal groove (3) having a predetermined seal groove volume;

(b) a relatively rotatable surface (6) having a clearance gap (23) with respect to said structure and having relative rotation relative to said circular seal groove (3);

(c) a solid generally circular compress ion-type hydrodynamic seal (2) composed of sealing material and adapted for direct compression between said peripheral seal groove wall (4) and said relatively rotatable surface (6), said generally circular compression-type hydrodynamic seal being located by said circular seal groove (3) and defining a seal volume being less than said seal groove volume;

(d) first and second body ends (26, 28) being defined by said solid generally circular compression type hydrodynamic seal (2) and being in contact respectively with said first and second spaced groove walls (8, 10);

(e) a static sealing surface (14) being defined by said solid generally circular compression-type hydrodynamic seal (2) and being disposed in compressed static sealing engagement with said peripheral groove wall (4);

(f) a compression-type dynamic sealing lip (16) being defined by said solid generally circular compression-type hydrodynamic seal (2) and being disposed in compressed sealing engagement with said relatively rotatable surface (6) and having a dynamic sealing surface (18) establishing a dynamic interference sealing interface with said relatively rotatable surface (6) and establishing interfacial contact pressure with said relatively rotatable surface, said compression-type dynamic sealing lip (16) providing for hydrodynamic lubrication of said dynamic interference sealing interface responsive to said relative rotation;

(g) said solid generally circular compression-type hydrodynamic seal (2) establishing sufficient expansion volume within said circular seal groove (3) to accommodate the combined effects of tolerance accumulation, thermal expansion and sealing material displacement while maintaining said interfacial contact pressure within compatible limits for said hydrodynamic lubrication of said dynamic interference sealing interface; and (h) a major portion of said compression-type dynamic sealing lip (16) abutting said second groove wall (10) and being supported thereby.

* * * * *

UNITED STATES PATENT AND TRADEMARK OFFICE
CERTIFICATE OF CORRECTION

PATENT NO.     : 6,315,302 B1
DATED          : November 13, 2001
INVENTOR(S)    : Conroy et al.

It is certified that error appears in the above-identified patent and that said Letters Patent is hereby corrected as shown below:

<u>Column 17,</u>
Line 12, delete "judgement", insert -- judgment --

<u>Column 28,</u>
Line 55, delete "ii", insert -- i --

<u>Column 29,</u>
Line 31, before the word "at", delete "a" (second instance).

Signed and Sealed this

Third Day of June, 2003

JAMES E. ROGAN
*Director of the United States Patent and Trademark Office*